United States Patent
Nakamura et al.

(10) Patent No.: US 7,198,665 B2
(45) Date of Patent: Apr. 3, 2007

(54) INK JET BLACK INK, INK SET, INK JET RECORDING METHOD, INK CARTRIDGE, RECORDING UNIT AND INK JET RECORDING APPARATUS

(75) Inventors: Kunihiko Nakamura, Shizuoka (JP); Shin-ichi Sato, Kanagawa (JP); Jun Yoshizawa, Tokyo (JP); Kumiko Mafune, Kanagawa (JP); Hideki Takayama, Kanagawa (JP); Daiji Okamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/321,530

(22) Filed: Dec. 30, 2005

(65) Prior Publication Data

US 2006/0102048 A1    May 18, 2006

Related U.S. Application Data

(63) Continuation of application No. PCT/JP05/012703, filed on Jul. 4, 2005.

(30) Foreign Application Priority Data

Jul. 2, 2004 (JP) .............................. 2004-196445
Jun. 30, 2005 (JP) .............................. 2005-192200

(51) Int. Cl.
*C09D 11/02*  (2006.01)
*B41J 2/01*   (2006.01)

(52) U.S. Cl. .............................. 106/31.52; 106/31.43; 106/31.49; 106/31.51; 347/100

(58) Field of Classification Search ............ 106/31.52, 106/31.43, 31.51, 31.49; 347/100; 534/806

See application file for complete search history.

(56) References Cited

U.S. PATENT DOCUMENTS

| | | | | | |
|---|---|---|---|---|---|
| 4,295,889 | A | * | 10/1981 | Eida et al. | 106/31.52 |
| 4,426,226 | A | * | 1/1984 | Ohta et al. | 106/31.51 |
| 4,723,129 | A | | 2/1988 | Endo et al. | 346/1.1 |
| 4,740,796 | A | | 4/1988 | Endo et al. | 346/1.1 |
| 5,091,009 | A | | 2/1992 | Nogami et al. | 106/287.1 |
| 5,092,926 | A | * | 3/1992 | Owatari | 106/31.51 |
| 5,221,497 | A | | 6/1993 | Watanabe et al. | 252/313.2 |
| 5,530,105 | A | * | 6/1996 | Yamazaki et al. | 106/31.49 |
| 6,086,660 | A | * | 7/2000 | Mukaiyama et al. | 106/31.43 |
| 2006/0119684 | A1 | * | 6/2006 | Mafune et al. | 347/100 |
| 2006/0137569 | A1 | * | 6/2006 | Osumi et al. | 106/31.13 |
| 2006/0144288 | A1 | * | 7/2006 | Ohno et al. | 106/31.27 |
| 2006/0146108 | A1 | * | 7/2006 | Sato et al. | 347/100 |
| 2006/0156952 | A1 | * | 7/2006 | Takayama et al. | 106/31.52 |

FOREIGN PATENT DOCUMENTS

| | | | |
|---|---|---|---|
| EP | 1602695 | * | 12/2005 |
| JP | 10-204308 | | 8/1998 |
| JP | 2803134 | | 9/1998 |
| JP | 2881847 | | 4/1999 |
| JP | 2000-290552 | | 10/2000 |
| JP | 2004-285351 | | 10/2004 |
| JP | 2005-36164 | | 2/2005 |
| WO | WO 2004/078860 A1 | | 9/2004 |

OTHER PUBLICATIONS

English translation of JP 2005/036164, Feb. 2005.*
RN554433-03-3 Registry, copyright 2006 ACS on STN., Jul. 2003.
RN546079-42-9 Registry, copyright 2006 ACS on STN, Jul. 2003.

* cited by examiner

*Primary Examiner*—Helene Klemanski
(74) *Attorney, Agent, or Firm*—Fitzpatrick, Cella, Harper & Scinto

(57) ABSTRACT

It is an object of the present invention to provide a black ink for an ink jet which possesses preferable color as a black ink for an ink jet, can attain high ozone resistance, high image density and sticking recovery property, and can suppress the decomposition of the compound represented by the general formula (I) or salt thereof during long-term storage. According to the present invention, there is provided a black ink for an ink jet characterized by comprising at least a compound represented by the following general formula (I) or a salt thereof, characterized in that the black ink comprises at least one moisture-retaining nitrogen compound, and the pH of the ink and the pH of the ink after storing for 10 days in an environment at a temperature of 60° C. are 9.5 or less.

General Formula (I):

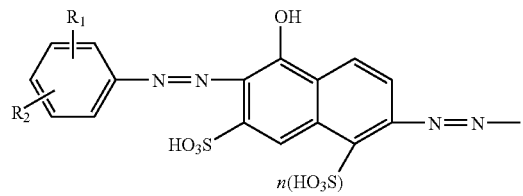

-continued

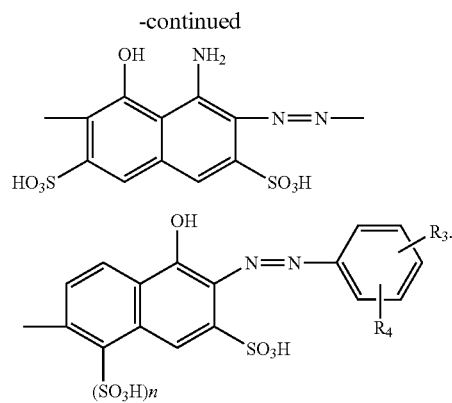

12 Claims, 8 Drawing Sheets

INK JET BLACK INK, INK SET, INK JET RECORDING METHOD, INK CARTRIDGE, RECORDING UNIT AND INK JET RECORDING APPARATUS

This application is a continuation of International Application No. PCT/JP2005/012703 filed on Jul. 4, 2005, which claims the benefit of Japanese Patent Application No. 2004-196445 filed on Jul. 2, 2004, and No. 2005-192200 filed on Jun. 30, 2005.

BACKGROUND OF THE INVENTION

1. Field of the Invention

The present invention relates to an ink jet ink which has high image density, excellent ozone resistance, and high sticking recovery property and storage stability, and, to an ink set which uses the ink as black ink. The present invention also relates to an ink jet recording method, a recording unit, an ink cartridge and an ink jet recording apparatus each using the ink set.

2. Related Background Art

An ink jet recording method is a recording method of applying a small ink droplet to any one of recording media such as plain paper and glossy media to form an image, and has become rapidly widespread owing to reduction in costs and improvement in recording rate. With the rapid spread of digital cameras in addition to improvement in the quality of images recorded by the method, the method has been generally used as a method of outputting photographic images comparable to silver halide photograph.

In recent years, image quality has undergone improvement more than ever owing to, for example, extreme reduction in size of an ink droplet and an improvement of the color gamut involved in the introduction of multi-color ink. Meanwhile, there have been growing demands for coloring materials and inks, and stricter property have been required in respect of improvement of color developability, whereby, as disclosed in Japanese Patent Application Laid-Open No. 2000-290552, such a coloring material and ink have been demanded more stringently to have improved color developability, and reliability such as sticking recovery property or ejection stability.

SUMMARY OF THE INVENTION

Black ink requires the attainment of high weather resistance, for instance ozone resistance, and high image density.

It is thought that there are two ways to attain high ozone resistance: (1) increase the ozone resistance of the dye itself; and (2) increase the ozone resistance of the recording medium. However, even if the weather resistance for a specific recording medium could be improved, this does not mean that all recording media would have increased weather resistance, and is thus not a fundamental solution to the issue of increasing weather resistance. Therefore, it is necessary to increase the ozone resistance of the dye itself.

It is also thought that there are three ways to attain a high image density: (1) increase the color developability of the dye itself; (2) increase the dye concentration in the ink; and (3) increase the amount of ink applied to the media. However, there are limits to the amount of ink which can be deposited onto the media, and further, it is difficult to achieve both an increase in the color developability of the dye itself with an increase in ozone resistance. Therefore, it is necessary to increase the dye concentration in the ink.

As a result of a great deal of investigation into how to increase the ozone resistance of the dye itself, the present inventors have discovered that a compound represented by the following general formula (I) or a salt thereof possesses excellent ozone resistance:

General Formula (I)

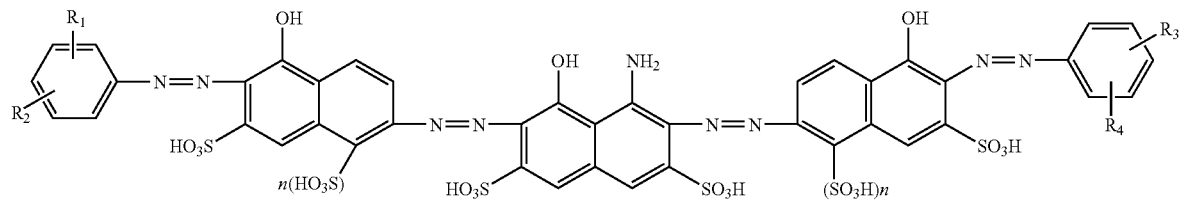

wherein $R_1$, $R_2$, $R_3$ and $R_4$ represent each independently a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group or a carboxyl group; an alkoxy group having 1 to 4 carbon atoms which may be further substituted with a carboxyl group or a sulfonic group; or an amino group substituted with a phenyl group, an alkyl group or an acyl group, and n represents 0 or 1.

However, it was learned that if the dye concentration in an ink of a dye, which is a compound represented by the above general formula (I) or salt thereof, is increased, sticking recovery property tends to decrease (susceptible to sticking). For this reason, it is necessary to use a moisture-retaining nitrogen compound or similar which is excellent in sticking recovery property.

However, upon further investigation the present inventors found that if the compound represented by the above general formula (I) or a salt thereof coexisted with a moisture-retaining nitrogen compound, and, if such mixture was stored over a long period of time at a high pH, the compound represented by the general formula (I) or salt thereof had the particular problem that it was susceptible to discoloration due to decomposition of the compound represented by the general formula (I) or salt thereof. In addition, it was also found that the higher the storage temperature of the ink, the faster this discoloration would occur.

Therefore, an object of the present invention is to provide an ink jet black ink which has preferable color as an ink jet black ink, can attain high ozone resistance, high image density and sticking recovery property, and can suppress the decomposition of the compound represented by the general formula (I) or a salt thereof during long-term storage.

Another objects of the present invention are to provide an ink set, an ink jet recording method, an ink cartridge, a recording unit and an ink jet recording apparatus each using the ink jet black ink.

The above objects are achieved by the present invention described below. That is, according to one aspect of the present invention, the ink jet black ink comprises at least a compound represented by the following general formula (I) or a salt thereof, characterized in that the black ink further comprises at least one moisture-retaining nitrogen compound, and the pH of the ink and the pH of the ink after storing for 10 days in an environment at a temperature of 60° C. are 9.5 or less:

carbon atoms; an alkoxy group having 1 to 4 carbon atoms; a hydroxyl group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfonic group or a carboxyl group; or an amino group substituted with an alkyl group or an acyl group, and n represents 0 or 1.

According to another aspect of the present invention, the ink jet black ink is characterized in that the ink jet black ink according to the above-described constitutions further comprises at least one compound selected from the group consisting of a condensed dye or a salt thereof of a compound represented by the following general formula (III)

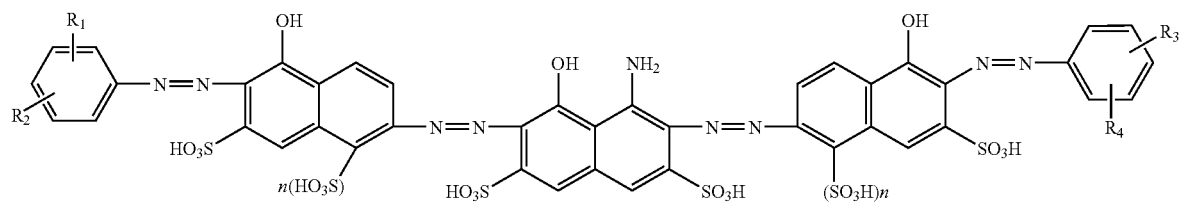

General Formula (I)

(wherein $R_1$, $R_2$, $R_3$ and $R_4$ represent each independently a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group or a carboxyl group; an alkoxy group having 1 to 4 carbon atoms which may be further substituted with a carboxyl group or a sulfonic group; or an amino group substituted with a phenyl group, an alkyl group or an acyl group, and n represents 0 or 1).

According to another aspect of the present invention, the ink jet black ink is characterized in that the ink jet black ink further comprises a compound represented by the following general formula (II) or a salt thereof:

and a compound represented by the following general formula (IV) and a dye obtained by the reduction of the condensed dye or the salt thereof, wherein the counter ion of the dye after the condensation or reduction is a hydrogen ion, alkali metal ion, organic amine cation or ammonium ion:

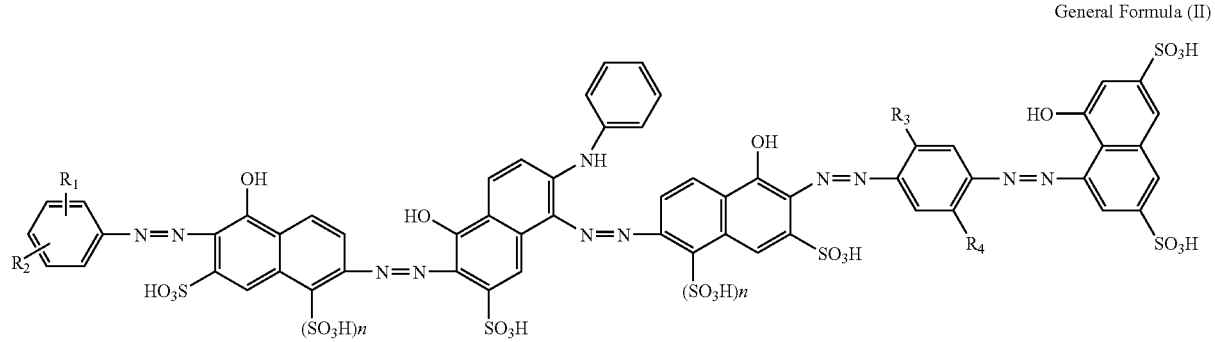

General Formula (II)

(wherein $R_1$ and $R_2$ represent each independently a hydrogen atom; a hydroxyl group; an amino group; a carboxyl group; a sulfonic group; an alkyl group having 1 to 4 carbon atoms; or an alkoxy group having 1 to 4 carbon atoms; and $R_3$ and $R_4$ represent a hydrogen atom; an alkyl group having 1 to 4

General Formula (III)

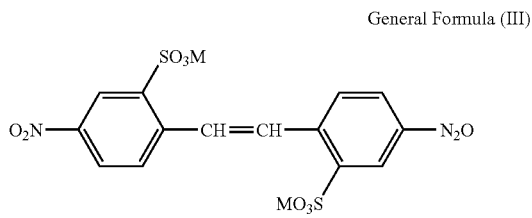

(wherein M represents a hydrogen atom or an alkali metal atom):

General Formula (IV)

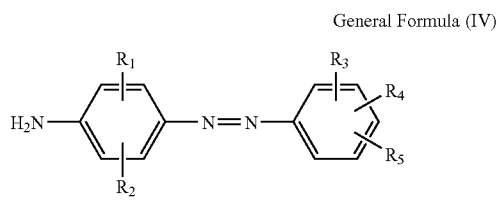

(wherein $R_1$, $R_2$, $R_3$, $R_4$ and $R_5$ represent each independently a hydrogen atom; a halogen atom; a hydroxyl group; a sulfonic group; a carboxyl group; an alkyl group having 1 to 4 carbon atoms; or an alkoxy group having 1 to 4 carbon atoms.)

According to another aspect of the present invention, the ink jet black ink is characterized in that the ink jet black ink according to the above-described constitutions further comprises a pH buffer.

According to another aspect of the present invention, an ink set is characterized by comprising a plurality of inks, which comprises the ink jet black ink according to the above-described constitutions as a black ink.

According to another aspect of the present invention, an ink set is characterized in that other inks capped using the same cap for capping the black ink do not comprise a volatile base.

According to another aspect of the present invention, an ink jet recording method is characterized in that the ink jet recording method comprises ejecting an ink by an ink jet method, wherein the ink comprises the ink jet black ink according to the above-described constitutions.

According to another aspect of the present invention, an ink cartridge is characterized in that the ink cartridge comprises an ink storage portion for storing ink, wherein the ink comprises the ink jet black ink according to the above-described constitutions.

According to another aspect of the present invention, a recording unit is characterized in that the recording unit comprises an ink storage portion for storing ink and a recording head for ejecting the ink, wherein the ink comprises the ink jet black ink according to the above-described constitutions.

According to another aspect of the present invention, an ink jet recording apparatus is characterized in that the ink jet recording apparatus comprises an ink storage portion for storing ink and a recording head for ejecting ink, wherein the ink comprises the ink jet black ink according to the above-described constitutions.

According to the present invention, an ink jet black ink can be provided which has preferable color as an ink jet black ink, can attain high ozone resistance, high image density and sticking recovery property, and can suppress the decomposition of the compound represented by the general formula (I) or salt thereof during long-term storage. In addition, an ink set, an ink jet recording method, an ink cartridge, a recording unit and an ink jet recording apparatus each using the ink jet black ink can also be provided.

DESCRIPTION OF THE PREFERRED EMBODIMENTS

Figure 1:
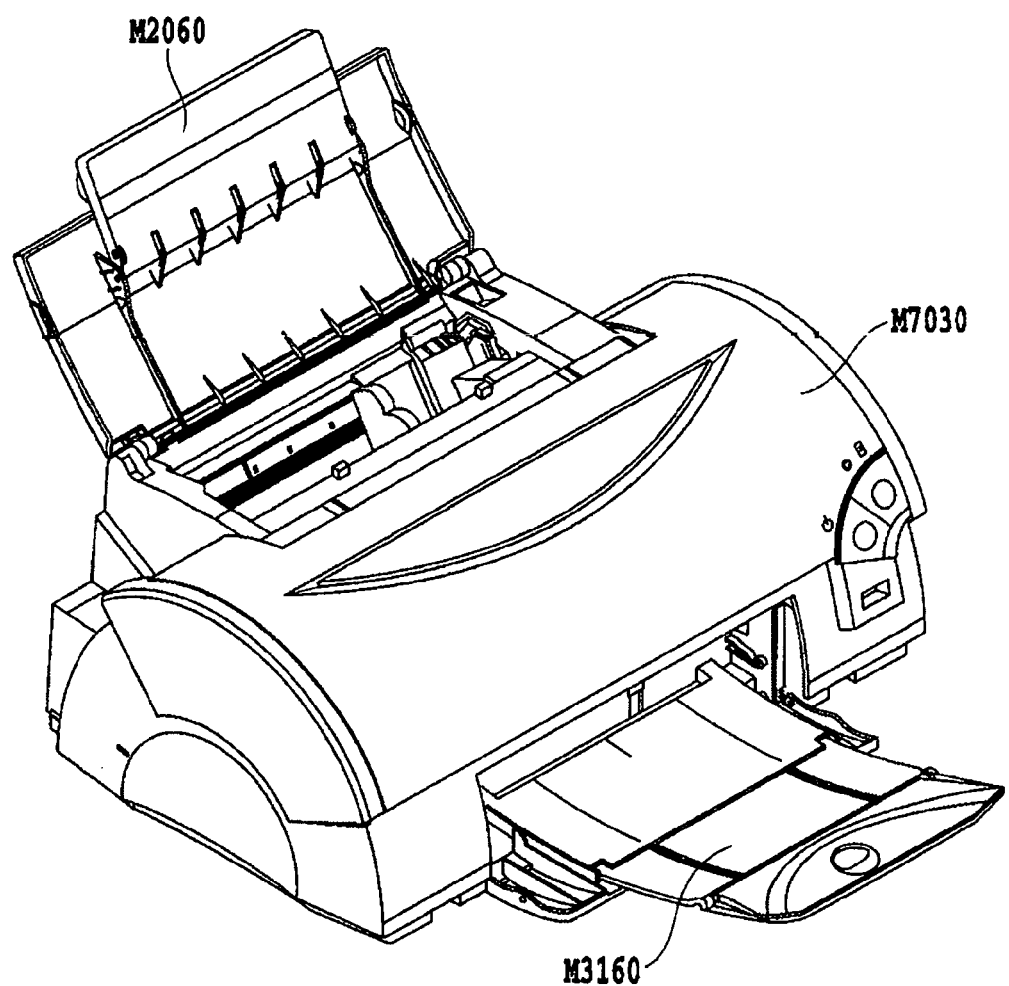
FIG. 1 is a perspective view of a recording apparatus.

Hereinafter, the present invention will be described in more detail by way of preferred embodiments.

In the present invention, when a coloring material is a salt, the salt is dissociated into ions in ink, but this state is represented by using the phrase "contains a salt" for convenience.

<Ink>

The components and other substances which constitute the ink jet black ink according to the present invention (hereinafter sometimes simply referred to as "ink") will now be described.

(Coloring Material)

The coloring material used in the ink according to the present invention is a compound represented by the following general formula (I) or a salt thereof.

General Formula (I)

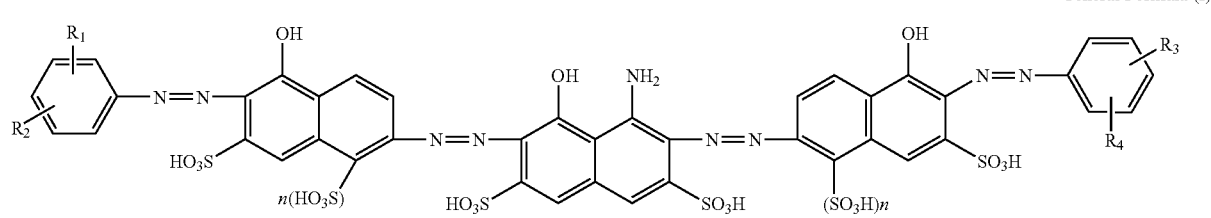

(In the general formula (I), $R_1$, $R_2$, $R_3$ and $R_4$ represent each independently a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group or a carboxyl group; an alkoxy group having 1 to 4 carbon atoms which may be further substituted with a carboxyl group or a sulfonic group; or an amino group substituted with a phenyl group, an alkyl group or an acyl group, and n represents 0 or 1.) Where n=0 in general formula (I) according to the present invention, this indicates that the $SO_3H$ site is hydrogen, as in the case of the below Exemplified Compound 1.

In the present invention in particular, the compound represented by the above general formula (I) or the salt thereof is preferably an Exemplified Compound 1 as shown below.

exhibited, the content of the compound represented by the general formula (I) or salt thereof is preferably from 0.1 mass % or more to 3.0 mass % or less of the ink total mass, and 0.5 mass % or more is even more preferable. In addition, the mass ratio between the content of the compound represented by the above general formula (I) or salt thereof and the content of the other coloring materials is preferably from 2:1 or more to 1:10 or less.

The compound represented by the general formula (I) or the salt thereof is preferably used in combination with a compound represented by the following general formula (II) or a salt thereof. It is further preferable to use in combination with an Exemplified Compound 2, the condensed dye of 4,4'-dinitrostilbene-2,2'disulfonic acid represented by the following general formula (III) and a compound represented by the following general formula (IV), or a dye obtained from reduction of the above-described condensed dye (the counter ion of the dye after the condensation or reduction is Exemplified Compound 1

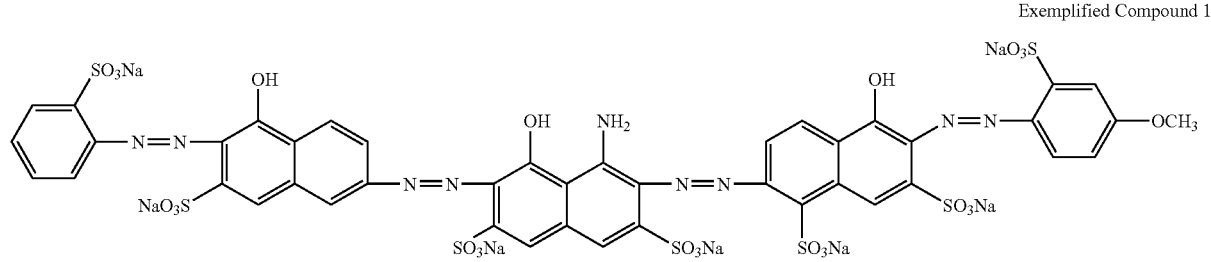

The content (mass %) of the coloring material, which is a compound represented by the general formula (I) or salt thereof, in the ink according to the present invention is preferably from 0.1 mass % or more to 10.0 mass % or less with respect to the total mass of the ink. This is because if the content is less than 0.1 mass %, sufficient image density, which is one of the advantageous effects of the present invention, cannot be attained, while if the content exceeds 10.0 mass %, sticking recovery property, which is one of the advantageous effects of the present invention, cannot be attained. However, to attain high image density, the content is preferably from 3.0 mass % or more to 10.0 mass % or less, and to attain even higher image density, the content is preferably from 4.5 mass % or more to 10.0 mass % or less.

The compound represented by the general formula (I) or salt thereof may be used in the ink according to the present invention by itself, or in combination with other coloring materials in order to adjust color tone. However, if a coloring material other than a compound represented by the general formula (I) or salt thereof is used, in order for the advantageous effects of the present invention to be sufficiently a hydrogen ion, alkali metal ion, organic amine cation or ammonium ion). These compounds are preferable because they are capable of providing high image density and a true-looking black ink since their C* is small. Here, C* denotes color saturation, thereby representing the degree of vividness. The smaller the value of C*, the more neutral the hue that is indicated.

To sufficiently attain the above-described advantageous effects, the mass ratio in the ink between the compound represented by the above general formula (I) or salt thereof and the compound represented by the following general formula (II) or the salt thereof is preferably from 2:1 or more to 1:5 or less. In addition, to sufficiently attain the above-described advantageous effects, the mass ratio in the ink between the compound represented by the above general formula (I) or the salt thereof and the condensed dye of compounds represented by the following general formula (III) and general formula (IV) is preferably from 2:1 or more to 1:5 or less.

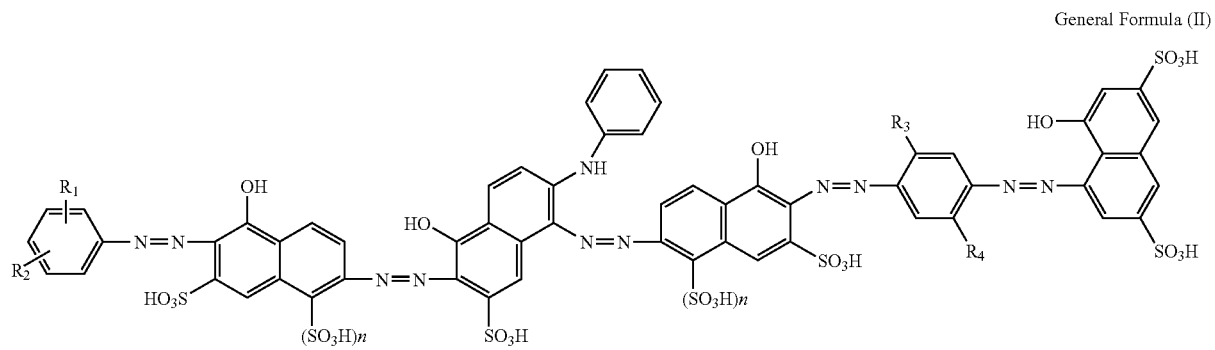

General Formula (II)

(In the general formula (II): $R_1$ and $R_2$ are each independently a hydrogen atom; a hydroxyl group; an amino group; a carboxyl group; a sulfonic group; an alkyl group having 1 to 4 carbon atoms; or an alkoxy group having 1 to 4 carbon atoms; and $R_3$ and $R_4$ represent a hydrogen atom; an alkyl group having 1 to 4 carbon atoms; an alkoxy group having 1 to 4 carbon atoms; a hydroxyl group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfonic group or a carboxyl group; or an amino group substituted with an alkyl group or an acyl group, and n represents 0 or 1.) In the same manner as in general formula (I), where n=0 in general formula (II) according to the present invention, this indicates that the $SO_3H$ site is hydrogen.

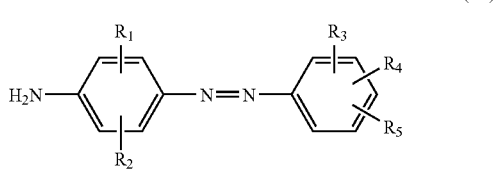

General Formula (IV)

(In the general formula (IV): $R_1$, $R_2$, $R_3$, $R_4$ and $R_5$ represent each independently a hydrogen atom; a halogen atom; a hydroxyl group; a sulfonic group; a carboxyl group; an alkyl group having 1 to 4 carbon atoms; or an alkoxy group having 1 to 4 carbon atoms.)

(Method of Testing Coloring Material)

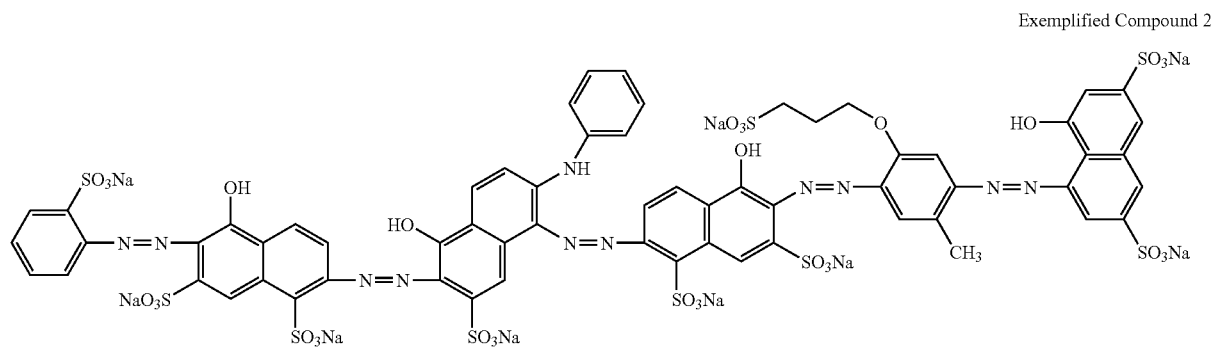

Exemplified Compound 2

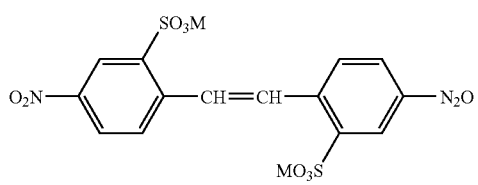

General Formula (III)

(In the general formula (III): M represents a hydrogen atom or an alkali metal atom.)

Coloring material used in the present invention can be tested by the following methods (1) to (3) each of which involves the use of high performance liquid chromatography (HPLC).

(1) Retention time of the peak
(2) Maximum absorption wavelength in the peak of (1)
(3) M/Z (posi, nega) of mass spectrum in the peak of (1)

Analysis conditions for high performance liquid chromatography are shown below. An ink solution diluted 1,000 times with pure water is analyzed by means of high performance liquid chromatography under the following conditions to measure the retention time of a main peak and the maximum absorption wavelength of a peak.

Column: Symmetry C18 2.1 mm×150 mm
Column temperature: 40° C.

Flow rate: 0.2 ml/min
PDA: 210 nm to 700 nm
Mobile phase and gradient condition: Table 1

TABLE 1

|   |                          | 0–5 min | 5–40 min    | 40–45 min |
|---|--------------------------|---------|-------------|-----------|
| A | Water                    | 85%     | 85% → 0%    | 0%        |
| B | Methanol                 | 10%     | 10% → 95%   | 95%       |
| C | 0.2 mol/l aqueous ammonium acetate | 5% | 5% | 5% |

In addition, analysis conditions for a mass spectrum are as shown below. The mass spectrum of the resultant peak is measured under the following conditions, and the M/Z (posi and nega) is measured.

|          | Ionization method          |                        |
|----------|----------------------------|------------------------|
| ESI      | Capillary voltage          | 3.1 kV                 |
|          | Desolvating gas            | 300° C.                |
|          | Ion source temperature     | 120° C.                |
| Detector | posi                       | 40 V 200–1500 amu/0.9 sec |
|          | nega                       | 40 V 200–1500 amu/0.9 sec |

Table 2 shows the values of retention time, maximum absorption wavelength, M/Z (posi), and M/Z (nega) of Exemplified Compounds 1, 2 and C.I. Direct Orange 39, which is the condensed dye of the compound represented by the general formula (III) and the compound represented by the general formula (IV). When a compound has the values shown in table 2, the compound can be determined to be the compound to be used in the present invention.

TABLE 2

|                         | Retention time [min] | Maximum absorption wavelength [nm] | M/Z Posi   | M/Z Nega  |
|-------------------------|----------------------|------------------------------------|------------|-----------|
| Exemplified Compound (1)| 15–17                | 645–665                            | 1315–1316  | 172–173   |
| Exemplified Compound (2)| 25–27                | 565–585                            | 833–834    | 554–555   |
| C.I. Direct Orange 39   | 30–32                | 400–420                            | 916–918    | 304–305   |

(Aqueous Medium)
[Moisture-Retaining Nitrogen Compound]

The ink according to the present invention is characterized by containing at least one moisture-retaining nitrogen compound. As used in the present invention, the term "moisture-retaining nitrogen compound" refers to a moisture-rich nitrogen compound. Specific examples of a moisture-retaining nitrogen compound include urea derivatives such as urea and ethyleneurea, and pyrrolidones such as 2-pyrrolidone and N-methyl-2-pyrrolidone. Of these, ethyleneurea and 2-pyrrolione are especially preferable.

Having a moisture-retaining nitrogen compound and the dye coexist has the advantageous effect that moisture is absorbed, or, moisture is less easily wicked away. If a moisture-retaining nitrogen compound is present in the ink in order to improve sticking recovery property, its content (mass %) is preferably from 0.1 mass % or more to 30.0 mass % or less with respect to the total mass of the ink, and more preferably from 1.0 mass % or more to 15.0 mass % or less. This is because if the content is less than 0.1 mass %, the improvement in sticking recovery property may not be sufficient, while if the content exceeds 30.0 mass %, good ink jet characteristics might not be attained due to the increase in ink viscosity.

[Other Water-Soluble Organic Solvents and Water]

In addition to the above-described moisture-retaining nitrogen compound, the ink according to the present invention may use water or a mixed solvent of water and various kinds of water-soluble organic solvent, to the extent that an advantageous effect can be gained from the addition of such a solvent, and, that the desired advantageous effects of the present invention are not harmed. The water-soluble organic solvent is not especially restricted as long as it is water-soluble. Examples include alcohol, polyalcohol, polyglycol, glycol ether, sulfur-containing polar solvents and the like. The content (mass %) of these water-soluble organic solvents is preferably no greater than 10.0 mass % with respect to the total mass of the ink. This is to allow the advantageous effects attained by using the coloring material according to general formula (I) in combination with the moisture-retaining nitrogen compound to be sufficiently exhibited. It is also preferable to use deionized water (ion-exchange water) as the water. The water content is preferably from 10.0 mass % to 90.0 mass % with respect to the total mass of the ink.

(Other Additive)

Various other additives, such as a surfactant, corrosion inhibitor, preservative, antimildew agent, antioxidant, reduction inhibitor, evaporation promoter, chelating agent and water-soluble polymer, may also be added in the present invention as necessary.

(pH)

In a situation where a compound represented by the general formula (I) or a salt thereof and a moisture-retaining nitrogen compound coexist, and, have been stored for a long period of time at a high pH, the compound represented by the general formula (I) or the salt thereof decomposes, to thereby cause discoloration. To suppress this discoloration, the pH of the ink must be a pH of 9.5 or less, and preferably a pH of 9.0 or less. It is also important that the pH of the ink is suppressed to be 9.5 or less not only during the initial period of the ink, but after long-term storage as well. This is because a part of the moisture-retaining nitrogen compound contained in the ink according to the present invention decomposes during storage, whereby the pH of the ink is raised. In such a case, even if the initial pH of the ink is kept at 9.5 or less, and preferably at 9.0 or less, the pH will rise during storage, which will result in the decomposition of the compound represented by the general formula (I). For this reason, the post-storage pH as well as the initial pH must be 9.5 or less, and more preferably 9.0 or less.

As described above, when a compound represented by the general formula (I) or a salt thereof and a moisture-retaining nitrogen compound are used together, by setting the pH in the initial and the post long-term storage ink to be 9.5 or less, and more preferably 9.0 or less, decomposition of the compound represented by the general formula (I) or the salt thereof can be suppressed.

It is known that the higher the temperature, the higher the decomposition rate of the moisture-retaining nitrogen compound. As a result of investigations carried out by the present inventors, it was learned that such moisture-retaining nitrogen compound decomposition when stored for 10 days at 60° C. corresponds to the moisture-retaining nitrogen compound decomposition which can occur during the usage period of an ordinary user. Therefore, if the 10 day 60° C. post-storage pH can be kept at 9.5 or less, and more preferably 9.0 or less, decomposition of the compound represented by the general formula (I) or salt thereof can be suppressed even for the usage environment of an ordinary user.

The present invention defines the pH of the ink as that being the pH in an ordinary state and the pH after long-term storage (the pH after storage for 10 days in a 60° C. environment). Here, an "ordinary state" can be the state at any point in time, including immediately after preparation of the ink, as long as the ink is in a condition in which it can be used by a user. In the ink according to the present invention, when the pH in an ordinary state (when the ink is being used) is 9.5 or less, or 9.0 or less, and, the pH after long-term storage (after storage for 10 days in a 60° C. environment) is 9.5 or less, or 9.0 or less, it can be assumed that during the entire time from immediately after preparation of the ink to during ink usage, that the pH of the ink is 9.5 or less or 9.0 or less. That is, it can be thought that it would be impossible for the pH of the ink to rise exceeding 9.5 or 9.0 during the entire time from immediately after preparation of the ink to during ink usage. It can, therefore, be judged that the pH of the ink immediately after preparation of the ink and the pH in an ordinary state (when the ink is being used) are essentially the same.

It is preferable to include a buffer in the ink to suppress the rise in pH during storage. Although any substance having a buffering effect may be used, specific examples of such a buffer include ammonium salts such as ammonium sulfate, ammonium nitrate and ammonium acetate, amino acids such as arginine, and Tris buffer. The buffer material content can be arbitrary, although from 0.01 mass % or more to 5.0 mass % or less with respect to the total mass of the ink jet black ink is more preferable. This is because if the content is less than 0.01 mass % it is hard to attain the effects which suppress the rise in pH, while if the content exceeds 5.0 mass % ink jet characteristics such as storage stability and sticking recovery property may worsen.

<Ink Set>

The ink according to the present invention can be preferably used in combination with other inks as an ink set. An ink set according to the present invention consists of the ink according to the present invention being used together with other inks such as cyan ink, magenta ink, yellow ink and black ink. It is noted that there are no particular restrictions regarding what other inks may be combined as the ink set. Further, while the term "ink set" used in the present invention obviously includes an ink tank itself integrating a plurality of ink tanks, this term also includes cases where a plurality of individual ink tanks are used in combination, as well as cases where the ink tank and a recording head are integrated.

At the cleaning portion of an ink jet recording apparatus, during the cleaning of the recording head before and after image recording, if the ink jet black ink according to the present invention and the other inks are capped using the same cap, it is preferable if the other inks do not contain a volatile base. If the other inks do contain a volatile base, the volatile base vaporizes during capping, thereby dissolving into the black ink which contains a compound represented by the general formula (I) or salt thereof, whereby the pH of the black ink rises. This results in the compound represented by the general formula (I) or salt thereof contained in the black ink decomposing, which can cause discoloration. In particular, this phenomenon is liable to occur if the volatile base is ammonia. Accordingly, if the ink jet black ink according to the present invention and the other inks are capped using the same cap, an ink set which does not contain ammonia in the other inks is even more preferable.

In addition to the case where the above-described volatile base has been contained since ink preparation, the ink set according to the present invention also includes the case where a volatile base was not contained at the time of ink preparation but is contained in the ink as a consequence of decomposition of an ink component due to changes over time.

<Recording Medium>

Any recording medium can be used for forming images by means of the ink of the present invention as long as recording is performed by applying the ink to the recording medium.

The present invention can be applied to a recording medium, in which a dye, a pigment, or other such coloring material is adsorbed onto fine particles forming porous structure in an ink-receiving layer, wherein an image is formed from at least this adsorbed fine particles. The present invention is particularly preferable when using an ink jet method. Such a recording medium for an ink jet preferably absorbs ink through cavities formed in the ink-receiving layer on a support; i.e. is an absorption type.

An absorption type ink-receiving layer is constituted as a porous layer that has fine particles as a main constituent and, as necessary, contains a binder or other such additives. Specific examples of the fine particles include inorganic pigments such as silica, clay, talc, calcium carbonate, kaolin, alumina or an aluminum oxide such as hydrated alumina, diatomaceous earth, titanium oxide, hydrotalcite, and zinc oxide; and organic pigments such as urea formalin resin, ethylene resin and styrene resin, wherein one kind or more of these substances can be used. A water-soluble polymer or latex can be preferably used as the binder. Examples which can be used include polyvinyl alcohol or a modified product thereof, starch or a modified product thereof, gelatin or a modified product thereof, arabia gum, cellulose derivatives such as carboxymethylcellulose, hydroxyethylcellulose and hydroxypropylmethylcellulose, vinylcopolymer latexes such as SBR latex, NBR latex, methylmethacrylate-butadiene copolymer latex, a functional-group-modified polymer latex and ethylene acetate vinyl copolymer, polyvinylpyrrolidone, maleic anhydride or a copolymer thereof, and an acrylic acid ester copolymer, wherein two or more of these substances can be used in combination as necessary. In addition, an additive can also be used as necessary, examples including a dispersant, a thickener, a pH modifier, a lubricant, a fluidity modifier, a surfactant, a defoaming agent, a release agent, a fluorescent whitener, an ultraviolet absorber and an antioxidant.

In particular, a recording media which can be preferably used in the present invention has fine particles having an average particle size of 1 μm or less as its main constituent, and is formed with an ink receiving layer. Especially preferable examples of the fine particles include silica fine particles or aluminum oxide fine particles. Preferable examples of silica fine particles include silica fine particles as represented by colloidal silica. Colloidal silica, which itself is available in the market, is particularly preferably what is described in JP Patent No. 2803134 or JP Patent No. 2881847. Preferable examples of aluminum oxide fine particles include hydrated alumina fine particles. One example of such hydrated alumina fine particles can include the hydrated alumina fine particles represented by the following general formula:

$$AlO_{3-n}(OH)_{2n} \cdot mH_2O$$

(In the formula, n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an $mH_2O$ crystal lattice in many cases. In addition, when heating such kind of material, m may reach 0.)

The recording medium preferably comprises a support for supporting the above-described ink-receiving layer. The support is not particularly restricted, and may be any support which allows the ink-receiving layer to be formed from the above-described porous fine particles, and, provides the recording medium with a rigidity which enables it to be conveyed by a conveying mechanism of an ink jet printer or the like. Specific examples include a paper support made from pulp raw material having natural cellulose as its main constituent; a plastic support made from materials such as polyester (e.g. polyethyleneterephthalate), cellulose triacetate, polycarbonate, polyvinylchloride, polypropylene and polyimide; and a resin-coated paper (e.g. RC paper) having on at least one side of the base paper a polyolefin resin coating coated layer to which a white pigment or similar substance is added.

<Ink Jet Recording Method>

The ink according to the present invention is especially preferably used for an ink jet recording method which comprises a step for ejecting ink by an ink jet method. Examples of an ink jet recording method include a recording method which ejects ink through the action of mechanical energy on the ink, and a recording method which ejects ink through the action of thermal energy on the ink. In particular, in the present invention an ink jet recording method which involves the use of thermal energy can be preferably used.

<Ink Cartridge>

Examples of a preferable ink cartridge for carrying out printing using the ink according to the present invention include an ink cartridge which comprises an ink storage portion for storing the ink. In the present invention, an ink cartridge can be preferably used which has substantially the same difference in evaporation quantity between each of the liquid chambers for each of the inks which constitute the ink set. The difference in evaporation quantity between each of the liquid chambers for each of the inks which constitute the ink set being substantially the "same" means that when each liquid chamber is filled with water, and the evaporation rate between each of the liquid chambers is measured, the difference in evaporation rates is no more than about 1%.

Figure 7:
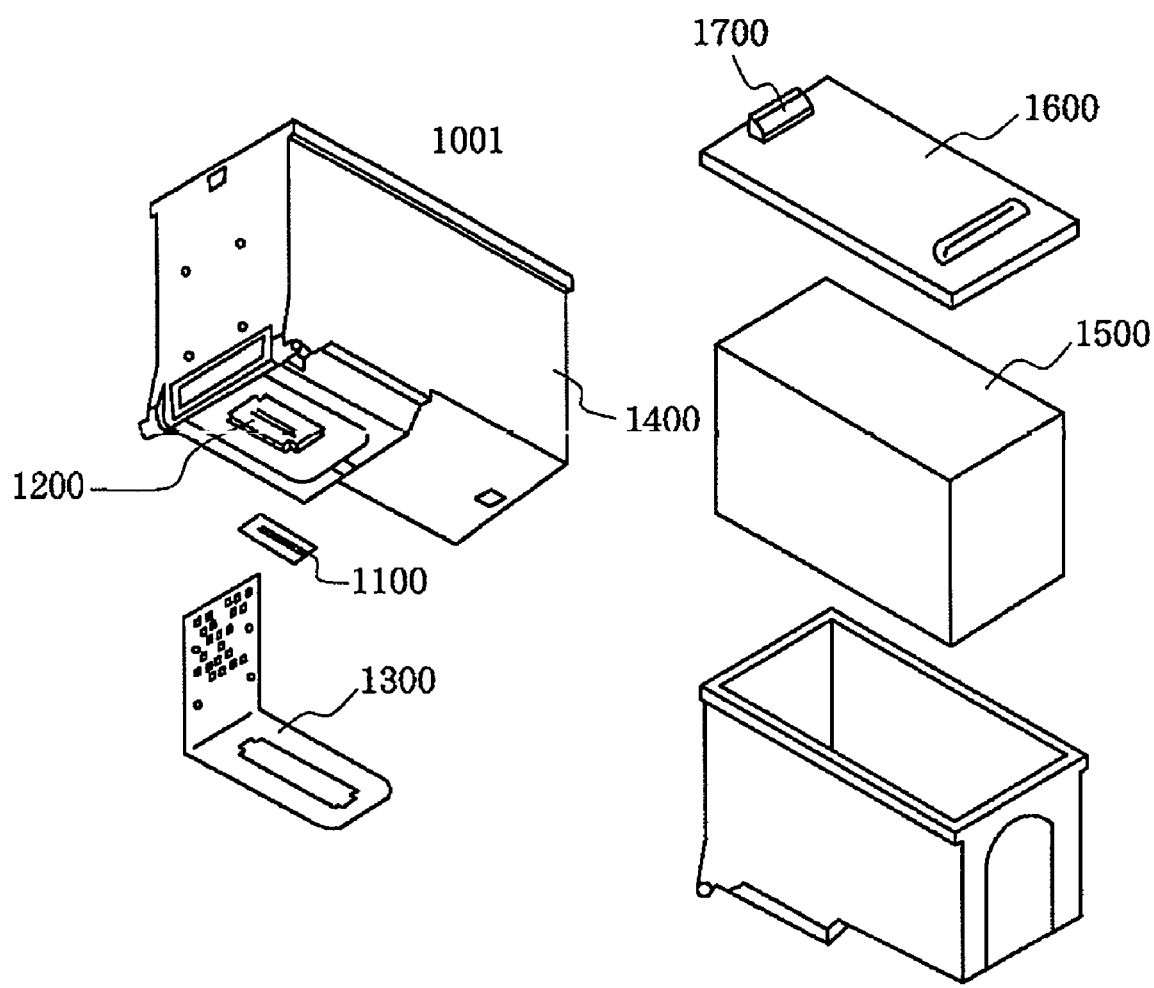
FIG. 7 is an exploded view of a recording head.

FIG. 7 is an exploded view of a recording head which can be used in the present invention. The recording head shown in FIG. 7 has an ink tank integrated structure. Recording head 1001 is supportively held by a carriage positioning means mounted on the ink jet recording apparatus body and an electric contact. Recording head 1001 is detachable from the carriage, and is exchanged once the mounted ink has been consumed.

The recording head 1001 is one to eject ink, and is constituted from a recording element substrate 1100 formed with ink supply ports aligned thereon, electrical wiring tape 1300 which forms an electrical signal path for applying an electrical signal for ejecting ink, an ink supply storage member 1400 formed by resin molding, an ink absorber 1500 which generates a negative pressure for storing the ink and a cap member 1600.

The ink supply storage member 1400 comprises the functions of an ink tank, by having a space for storing the absorber 1500 for generating the negative pressure for storing in its interior cyan, magenta and yellow ink, and that of an ink supply, by forming an independent ink path for directing ink to the ink supply ports of the recording element substrate 1100. The ink supply ports for supplying ink to the recording element substrate 1100 are formed at a downstream portion of the ink flow path, wherein the recording element substrate 1100 is held against the ink supply storage member 1400 so that the ink supply ports of the recording element substrate 1100 are in communication with the ink supply ports 1200 of the ink supply storage member 1400. On the plane of the circumference in the vicinity of the ink supply ports 1200, the back surface of a part of the electrical wiring tape 1300 is held. The cap member 1600 is welded to an upper opening of the ink supply storage member 1400, whereby the interior space of the ink supply storage member 1400 is blocked off. The cap member 1600 comprises an engaging member 1700 for holding the recording head to the ink jet recording apparatus.

Figure 8:
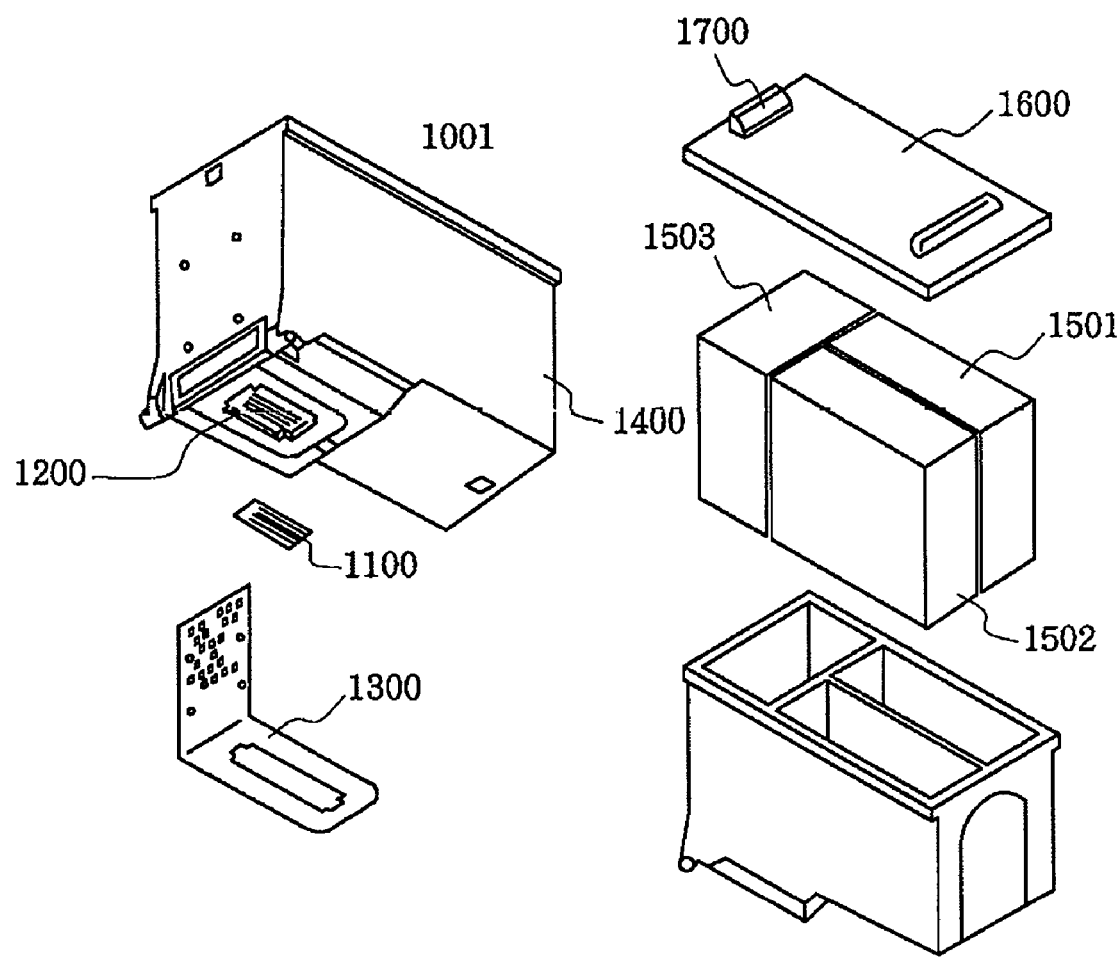
FIG. 8 is an exploded view of another recording head.

FIG. 8 is an exploded view of another example of a recording head which can be used in the present invention. As in FIG. 7, the recording head shown in FIG. 8 has an ink tank integrated structure. Recording head 1001 can mount a plurality of different color inks (e.g. cyan ink, magenta ink and yellow ink), and is exchanged once the mounted inks have been consumed.

The recording head 1001 is one to eject a plurality of different color inks (e.g. cyan ink, magenta ink and yellow ink), and is constituted from, for example, a recording element substrate 1100 formed with cyan, magenta and yellow ink supply ports aligned thereon. An ink supply storage member 1400 comprises the functions of an ink tank, storing absorbers 1501, 1502 and 1503 for generating the negative pressure for storing cyan, magenta and yellow ink in their interior, and that of an ink supply, by forming independent ink paths for directing the respective inks to ink supply ports of the recording element substrate 1100.

<Recording Unit>

Examples of a preferable recording unit for carrying out recording using the ink according to the present invention include a recording unit which comprises an ink storage portion for storing such ink and a recording head. In particular, such examples include a recording unit in which the above-described recording head causes thermal energy responding to a recording signal to act upon the ink, to thereby generate an ink droplet using this energy.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by virtue of the energy.

The schematic constitution of a mechanism portion of an ink jet recording apparatus will be described below. A recording apparatus main body is constituted of a sheet feeding portion, a sheet conveying portion, a carriage portion, a sheet discharge portion, and a cleaning portion, and an external packaging portion for protecting them and providing them with a design, each of which plays a role of each mechanism. The outline of each of them will be described below.

Figure 2:
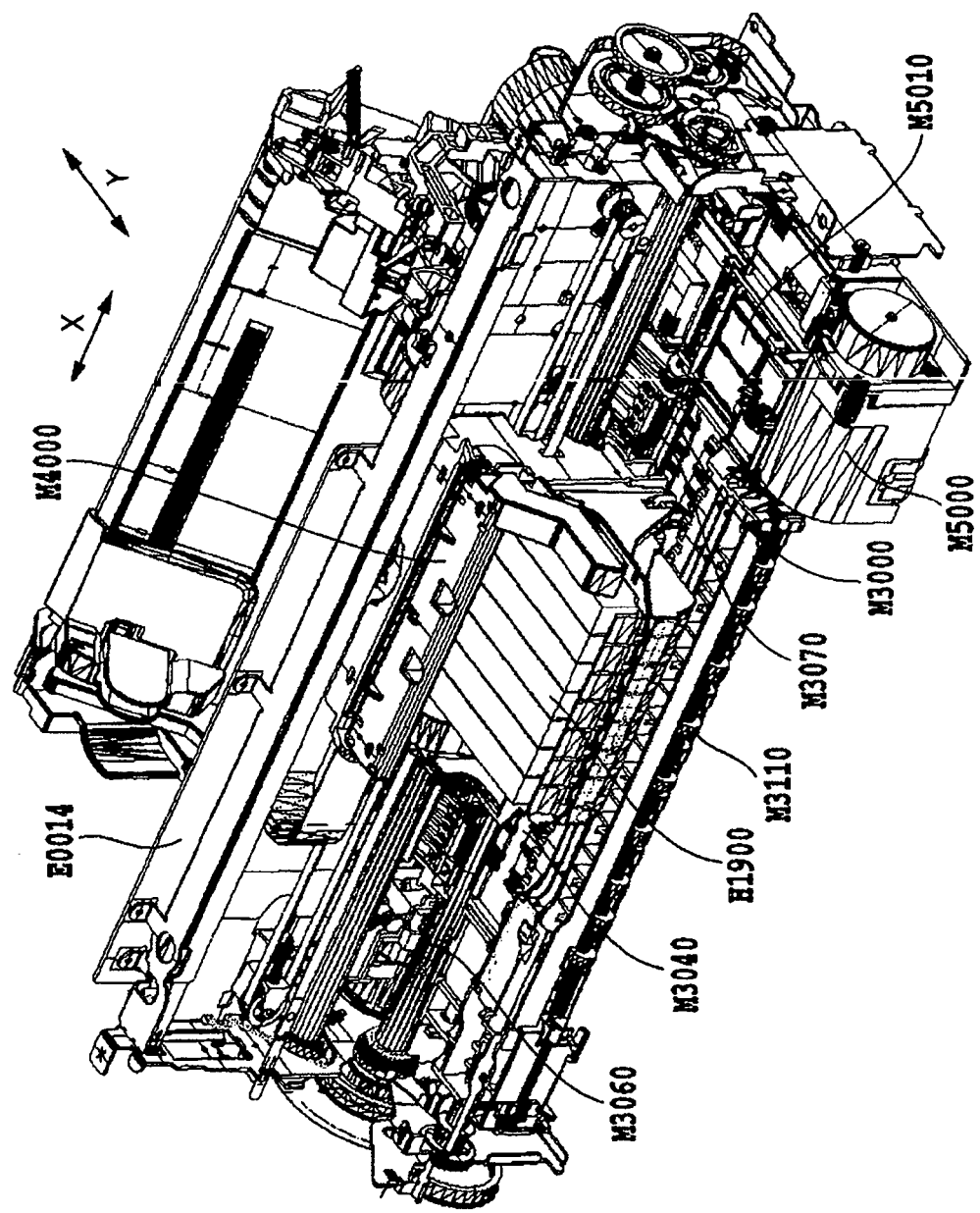
FIG. 2 is a perspective view of a mechanism portion of the recording apparatus.
Figure 3:
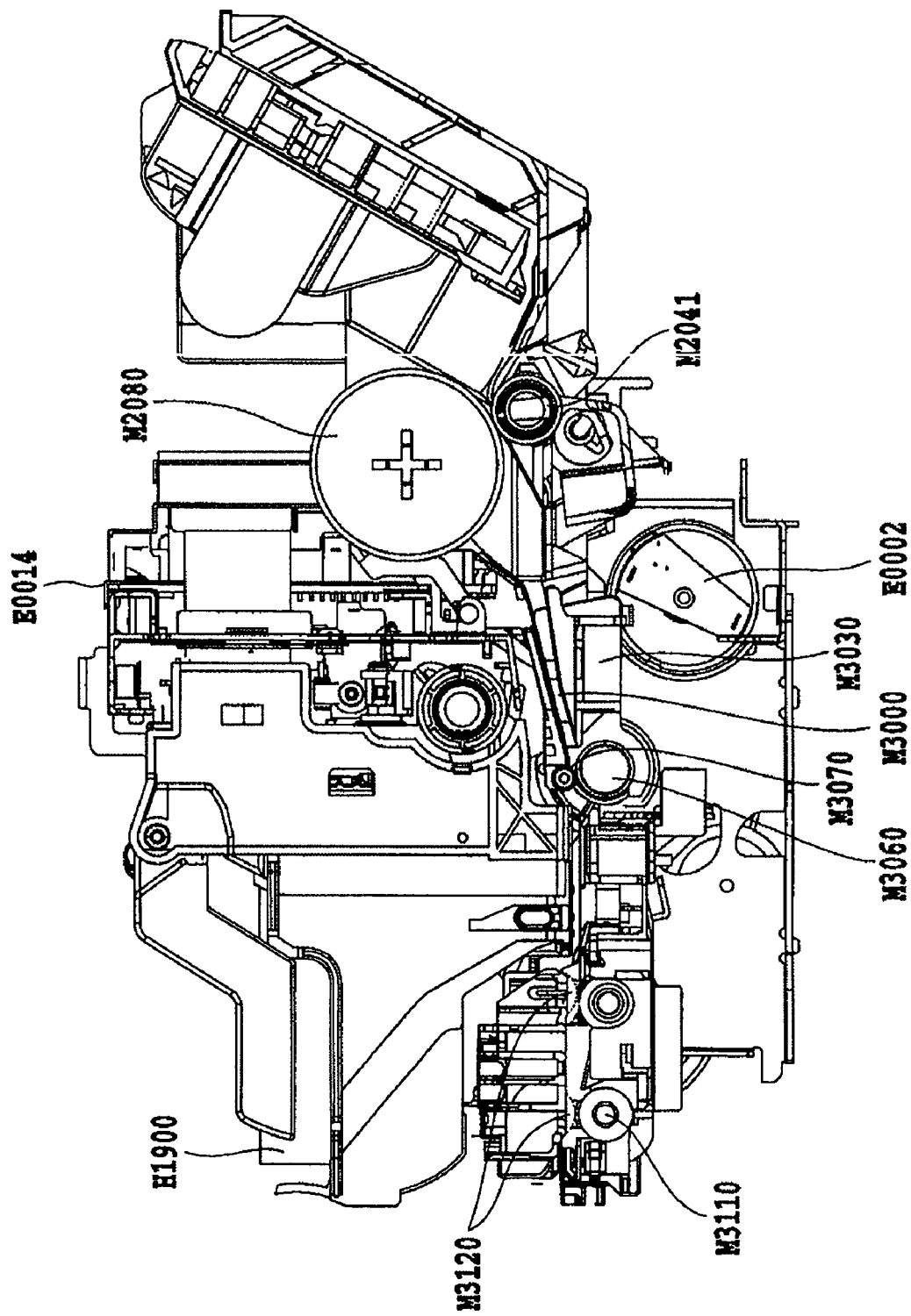
FIG. 3 is a sectional view of a recording apparatus.

FIG. 1 is a perspective view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When sheets are fed in the recording apparatus, only the predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in the column direction and sub scanning in which a recording medium is conveyed in the row direction by the conveying roller M3060 are alternately repeated, whereby an image is formed on the recording medium.

Finally, the recording medium on which an image has been formed is pinched at a nip between a first sheet discharge roller M3110 and a spur M3120 in the sheet discharge portion, conveyed, and discharged to a sheet discharge tray M3160.

In the cleaning portion, when a pump M5000 is allowed to act in such a state that a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described below. The head cartridge H1000 includes the recording head H1001, means for mounting ink tanks H1900, and means for supplying ink from the ink tanks H1900 to the recording head, and is detachably mounted on the carriage M4000.

Figure 4:
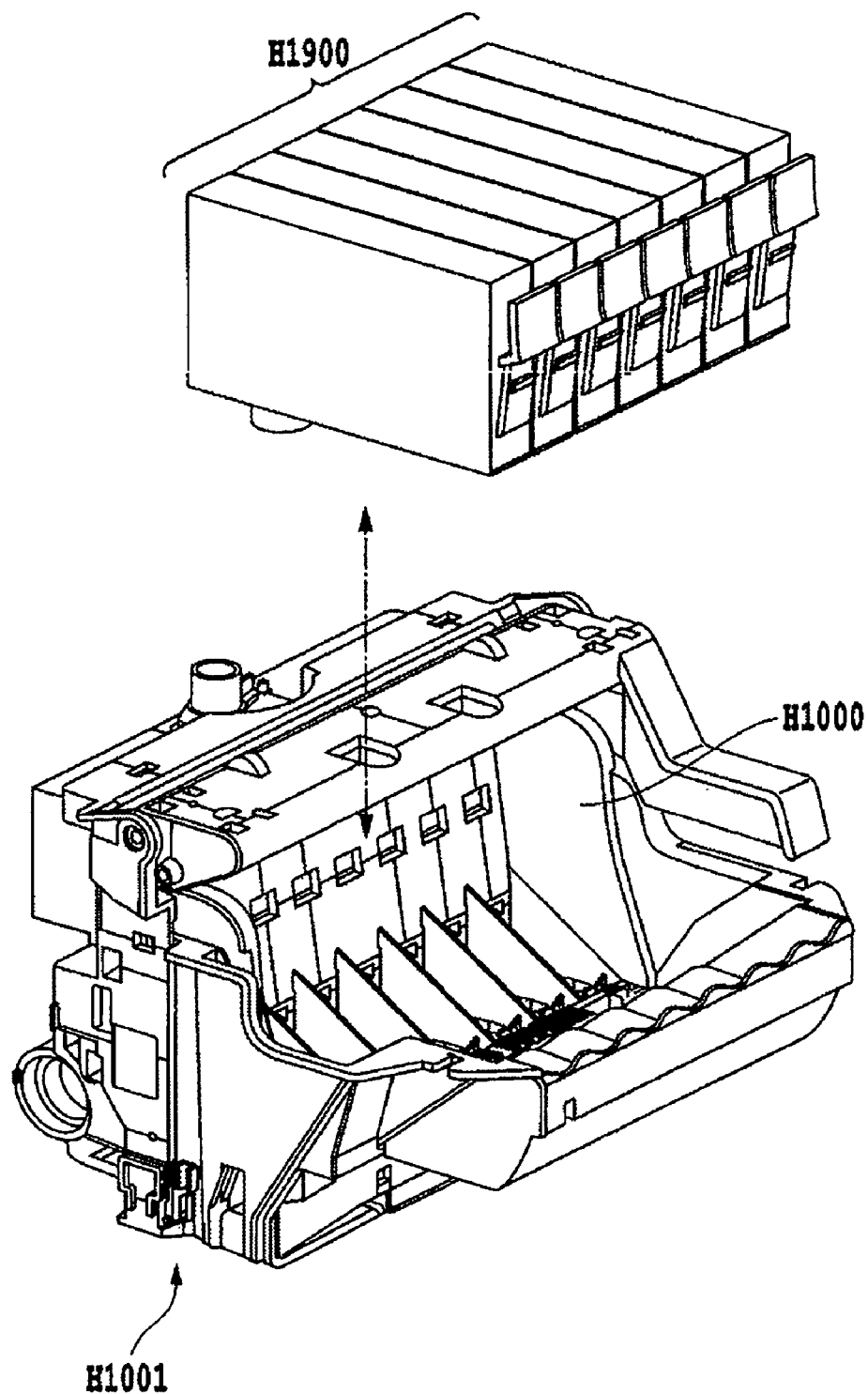
FIG. 4 is a perspective view showing a state in which an ink tank is mounted on a head cartridge.

FIG. 4 shows how the ink tanks H1900 are mounted on the head cartridge H1000. The recording apparatus forms images by means of yellow, magenta, cyan, black, pale magenta, pale cyan, and green inks, and so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in such a state that the head cartridge H1000 is mounted on the carriage M4000.

Figure 5:
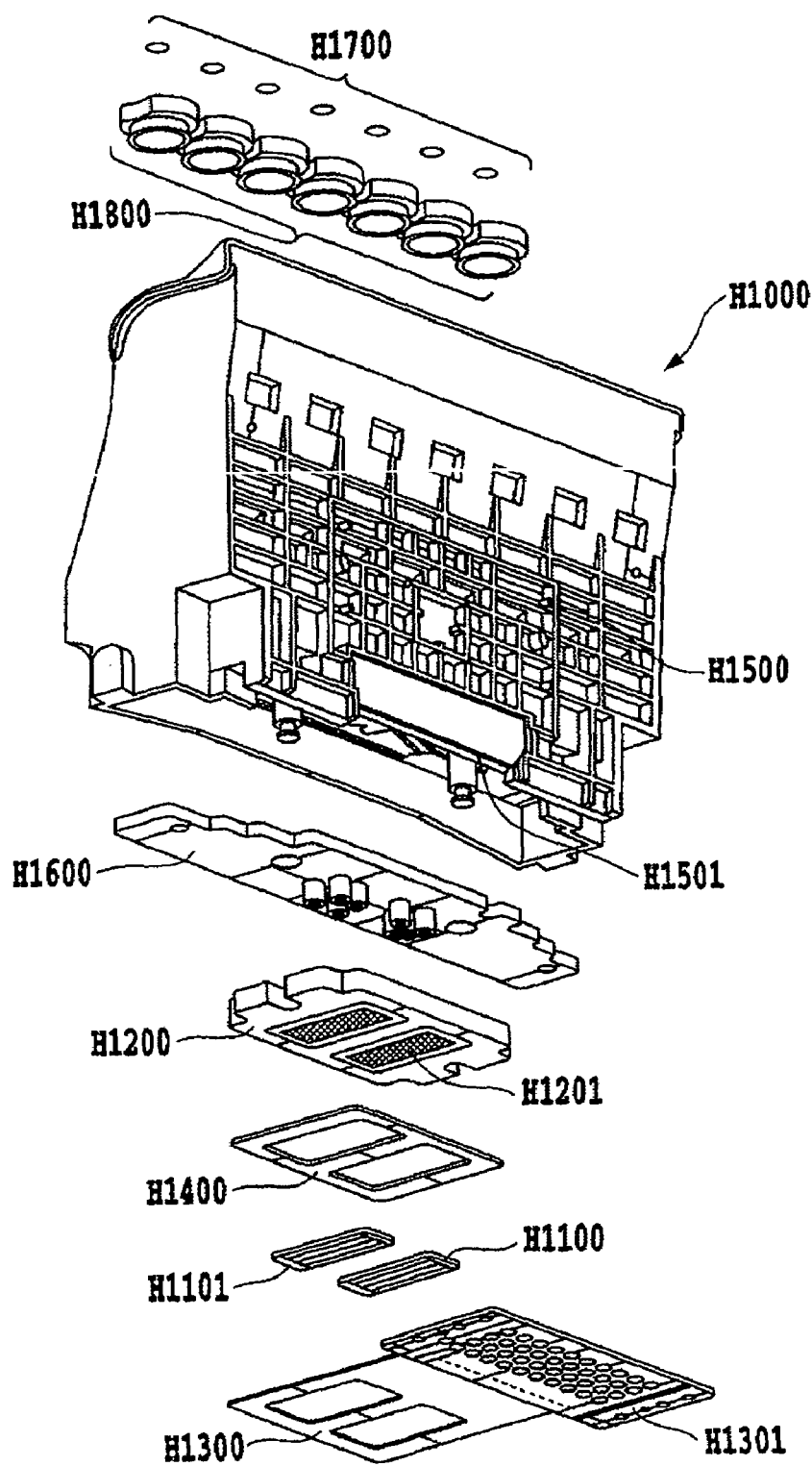
FIG. 5 is an exploded perspective view of the head cartridge.

FIG. 5 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is a Si substrate having multiple recording elements (nozzles) for ejecting ink formed on one side by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 6:
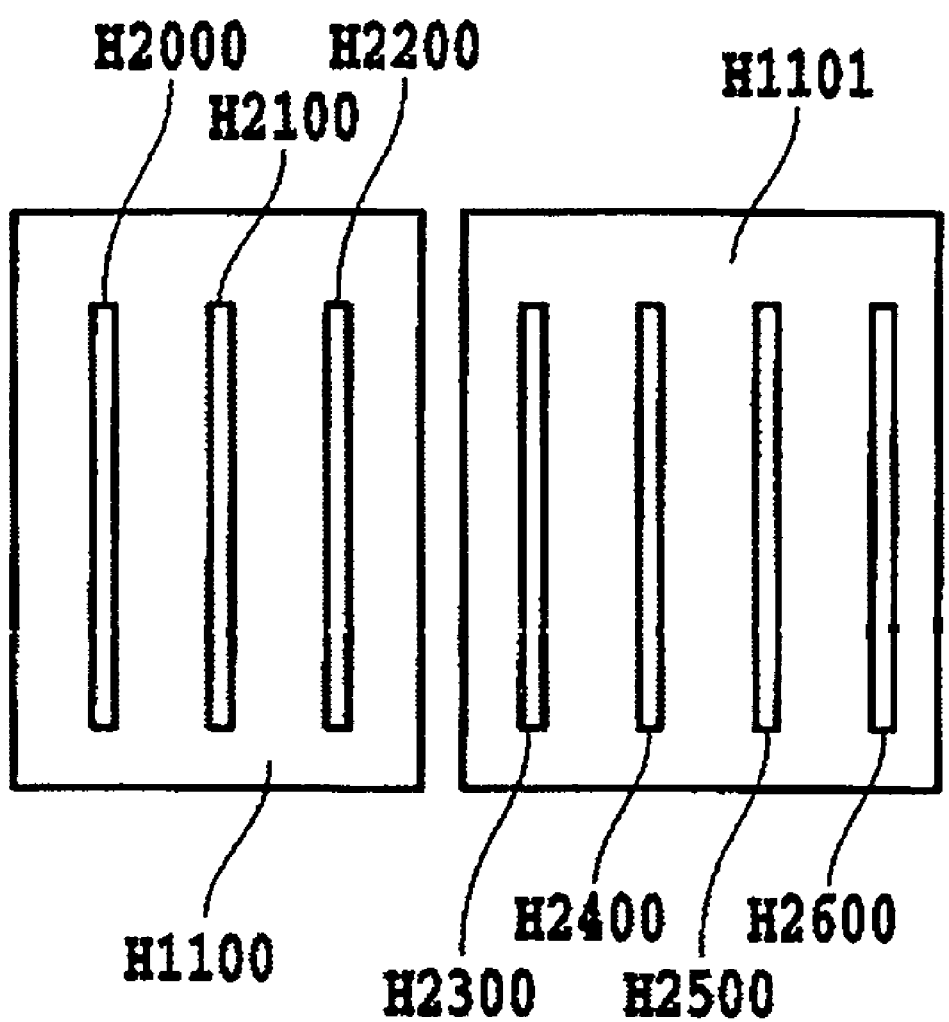
FIG. 6 is a front view showing a recording element substrate in the head cartridge.

FIG. 6 is an enlarged front view for explaining the constitution of each of the first recording element substrate H1100 and the second recording element substrate H1101. Reference symbols H2000 to H2600 denote recording element trains (hereinafter referred to also as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at intervals of 1,200 dpi (dot/inch; reference value) in the conveying direction of a recording medium, and each nozzle ejects about 2 pl of ink. An opening area in each nozzle ejection port is set to be about 100 $\mu m^2$. The first recording element substrate H1100 and the second recording element substrate H1101 are bonded and fixed to the first plate H1200 having ink supply ports H1201 formed thereon for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 impresses electrical signals for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at the end portion of the electric wiring to receive electrical signals from the recording apparatus main body. The external signal input terminal H1301 is positioned and fixed to the back surface side of the tank holder H1500.

The flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at the end portion on the ink tank side of the ink flow path H1501 engaged with the ink tanks H1900, and so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is made up by connecting a tank holder portion constituted of the tank holder H1500, the flow path forming member H1600, the filter H1700 and the seal rubber H1800, with the recording head portion H1001 constituted of the first recording element substrate H1100, the second recording element substrate H1101, the first plate H1200, the electric wiring substrate H1300 and the second plate H1400 by the use of an adhesive or the like.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

As for the representative structure and principle, it is preferred to use basic principles disclosed in, for example, U.S. Pat. Nos. 4,723,129 and 4,740,796. The method is applicable to any one of a so-called on-demand type and a so-called continuous type. In particular, the method is effective for the on-demand type because of the following reason. At least one driving signal which corresponds to recording information and causes a sudden increase in temperature exceeding nuclear boiling is applied to electrothermal converters arranged corresponding to a sheet or liquid flow path holding a liquid (ink), thereby causing the electrothermal converter to generate thermal energy. Then, film boiling is generated on the thermal action surface of a recording head. As a result, an air bubble in the liquid (ink) can be formed so as to be in one-to-one correspondence with the driving signal. The growth and contraction of the air bubble elect the liquid (ink) through an opening for ejection, thereby forming at least one droplet. It is more preferable that the driving signal is of a pulse shape because the growth and contraction of an air bubble can be performed immediately and appropriately, and hence the liquid (ink) can be ejected with excellent responsiveness.

As an example of a second embodiment of an ink jet recording apparatus utilizing mechanical energy, an on-demand ink jet recording head may be cited, including: a nozzle forming substrate having multiple nozzles; pressure generating means arranged so as to be opposite to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatuses as described above in which a head and an ink tank are separated, and may be one in which a head and an ink tank are unified so that they are unseparable. The ink tank may be separably or unseparably unified with the head to be mounted on a carriage, or may be mounted at a fixing portion of an apparatus to supply ink to a recording head through an ink supply member such as a tube. When the ink tank is provided with a constitution for applying a suitable negative pressure to the recording head, an absorber may be arranged in an ink storage portion of the ink tank, or the ink tank may have a flexible ink storage bag and a spring portion for applying bias in the direction of expanding the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples unless the examples depart from the gist of the present invention. Unless otherwise specified, the term "part" of each ink component in examples and comparative examples represents "part by mass".

<Preparation of Coloring Material>

[Preparation of Exemplified Compound 1]

A compound represented by the following formula (A) was added to water to which sodium hydroxide had been added, and thereby dissolved. To resulting solution was added an aqueous solution of sodium nitrite, whereby diazotization took place. The resulting diazo turbid solution was added dropwise to an aqueous alkaline solution of 6-amino-1-hydroxynaphthalene-3,5-disulfonic acid, whereby a coupling reaction occurred. The resulting product was then salted out with sodium chloride. The salted out product was filtered and washed. Subsequently, the above compound was added to water to which sodium hydroxide had been added, and thereby dissolved. To the resulting solution were added hydrochloric acid and sodium nitrite, whereby diazotization took place. To this diazo turbid solution were added 8-amino-1-hydroxynaphthalene-3,6-disulfonic acid and then sodium carbonate. The resulting mixture was stirred overnight, to thereby obtain a reaction solution A. Next, 1-amino-2-benzenesulfonic acid was added to water to which sodium hydroxide had been added, and thereby dissolved. To the resulting solution was added an aqueous solution of sodium nitrite, whereby diazotization took place. This diazo turbid solution was added dropwise to an aqueous alkaline solution of 6-amino-1-hydroxynaphthalene-3-sulfonic acid, whereby a coupling reaction occurred. The resulting product was then salted out with sodium chloride. The salted out product was filtered and washed. Subsequently, the above compound was added to water to which sodium hydroxide had been added, and thereby dissolved. To the resulting solution were added hydrochloric acid and sodium nitrite, whereby diazotization took place. This diazo turbid solution was added to the above-described reaction solution A, whereby a coupling reaction occurred. The resulting product was then salted out with sodium chloride. The salted out product was filtered and washed, to thereby prepare the Exemplified Compound 1.

Formula (A)

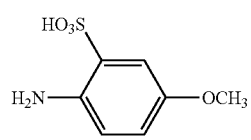

Exemplified Compound 1

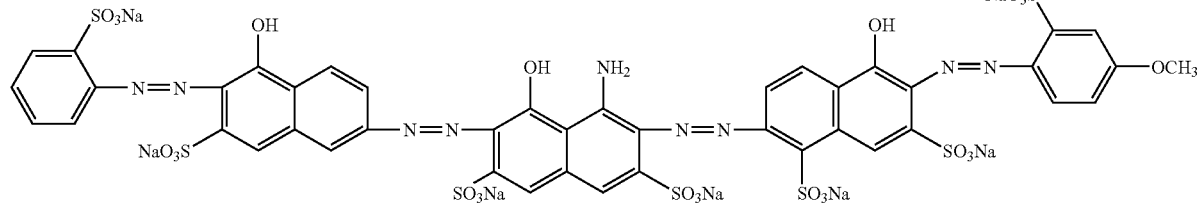

[Preparation of Exemplified Compound 2]

A compound represented by the following formula (B) was added to water to which sodium carbonate had been added, and thereby dissolved. To the resulting solution were added hydrochloric acid and sodium nitrite, whereby diazotization took place. To this diazo turbid solution was added dropwise an aqueous solution of 6-phenylamino-1-hydroxynaphthalene-3-sulfonic acid, and dissolved in the presence of sodium carbonate, to thereby prepare a solution (B). Next, 2-aminosulfonic acid was dissolved in the presence of sodium hydroxide, and to the resulting solution were added hydrochloric acid and sodium nitrite, whereby diazotization took place. Next, 6-amino-1-hydroxynaphthalene-3-sulfonic acid was dissolved in the presence of sodium hydroxide, and to the resulting solution was added acetic anhydride, whereby acetylation took place. To this was added dropwise the above-described diazo turbid solution in the presence of sodium carbonate, whereby a coupling reaction took place, to thereby prepare a reaction solution (B). To this reaction solution (B) was added sodium hydroxide, followed by addition of sodium chloride, for carrying out salt precipitation, to thereby prepare a compound. This compound was dissolved in water in the presence of sodium hydroxide, and to the resulting solution were added hydrochloric acid and sodium nitrite, whereby diazotization took place. To this diazo turbid solution was dropwise added the solution (B) in the presence of sodium carbonate, whereby a coupling reaction was completed, to thereby prepare a reaction liquid. After this reaction liquid had been salted out with sodium chloride, the resulting product was filtered, to thereby prepare a compound (B). To N,N-dimethylformamide were added 2-nitro-4-cresol, toluene and potassium hydroxide, whereby water was distilled off by azeotropy with the toluene. To the resulting product was added dropwise propane sultone, followed by addition of sodium hydroxide. This solution was concentrated, and to the concentrate was then added palladium carbon in an autoclave. Hydrogen gas was put therein, to thereby obtain a solution. To this solution were added hydrochloric acid and sodium nitrite, whereby diazotization took place. The solution (B) was added dropwise to the resulting reaction product, whereby a coupling reaction was completed in the presence of sodium hydroxide, to thereby prepare a reaction solution. To this reaction solution were added hydrochloric acid and sodium nitrite, whereby diazotization took place. The resulting diazo turbid solution was added to an aqueous solution in which the above-described reaction solution (B) had been dissolved, whereby a coupling reaction was completed. The resulting product was then salted out with sodium chloride. The salted out product was filtered and washed, to thereby prepare the Exemplified Compound 2.

Formula (B)

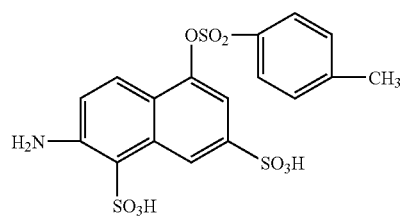

Exemplified Compound 2

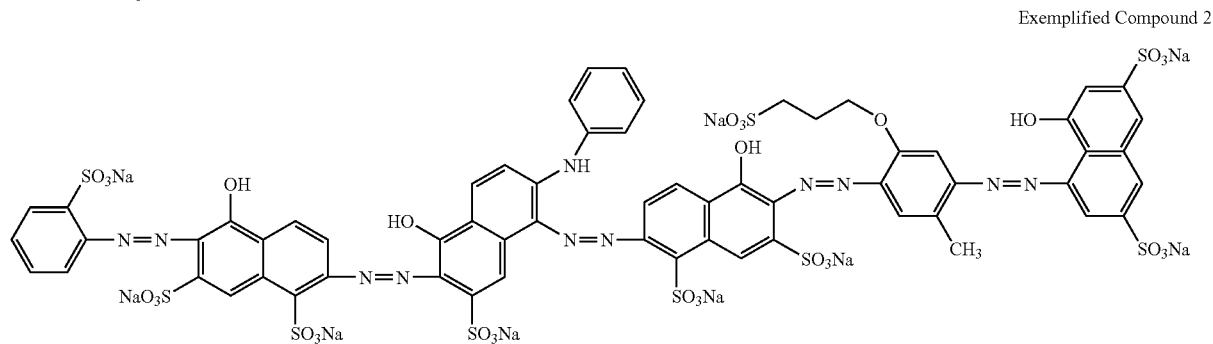

<Preparation of Ink>

The components shown in Table 3 below were mixed and sufficiently stirred. After that, the resultant mixture was filtered through a membrane filter having a pore size of 0.2 μm under pressure to prepare the black inks 1 to 9.

Black inks 1 to 9 were measured for pH (initial) and pH (post-storage) under the below-described conditions. The evaluated results for pH are shown in Table 3.

(A) pH (Initial)

The initial pH of the ink was measured using a pH meter. The pH (initial) criteria were as follows.

A: pH of 9.0 or less
B: pH exceeding 9.0 and 9.5 or less
C: pH exceeding 9.5

(B) pH (Post-storage)

Ink was put into a Teflon jar, and stored for 10 days at 60° C. The post-storage pH of the ink was measured using a pH meter. The pH (post-storage) criteria were as follows.

A: pH of 9.0 or less
B: pH exceeding 9.0 and 9.5 or less
C: pH exceeding 9.5 drying for 24 hours. The images were then evaluated for C*. A spectrophotometer (Spectorolino; manufactured by Gretag Macbeth) was used for the measurement. The color criteria were as follows. The evaluated results are shown in Table 4.

A: C* less than 10
B: C* of 10 or more and 20 or less
C: C* of 20 or more (3) Sticking Recovery Property Ink was filled into the recording head portion. The recording head portion was removed, and an ejection orifice was exposed to an environmental atmosphere, and left for 2 weeks in a 35° C. temperature and 10% humidity environment. The recording head was then reattached to the printer body for evaluation of sticking recovery property. The sticking recovery property criteria were as follows. The evaluated results are shown in Table 4.

A: After attaching the head, all nozzles had recovered without problem to be ejection-capable within 2 purgings
B: After attaching the head, all nozzles had recovered without problem to be ejection-capable after 3 or 4 purgings

TABLE 3

| | Black Ink | | | | | | | | |
|---|---|---|---|---|---|---|---|---|---|
| | 1 | 2 | 3 | 4 | 5 | 6 | 7 | 8 | 9 |
| Exemplified Compound 1 | 2.0 | 5.0 | 5.0 | 5.0 | 5.0 | 1.0 | 5.0 | 5.0 | 5.0 |
| Exemplified Compound 2 | | | | | | 2.0 | | | |
| C.I. Direct Orange 39 | | | | | | 2.0 | | | |
| Ethylene glycol | 7.5 | 7.5 | 7.5 | 7.5 | 10.0 | 10.0 | 7.5 | 7.5 | 7.5 |
| 2-Pyrrolidone | | 7.5 | | | | | | | 7.5 |
| Ethyleneurea | 7.5 | | 7.5 | 7.5 | | 7.5 | | | |
| Urea | | | | | 7.5 | | 7.5 | | |
| 4N Aqueous LiOH | | | | (*1) | | | | | (*2) |
| Acetylenol E100 | 1.0 | 1.0 | 1.0 | 1.0 | 1.0 | 1.0 | 1.0 | 1.0 | 1.0 |
| Ammonium sulfate | | | | | | 1.0 | | | |
| Pure water | 82.0 | 79.0 | 79.0 | 79.0 | 75.5 | 76.5 | 79.0 | 86.5 | 79.0 |
| Initial pH | A | A | A | B | A | A | A | A | C |
| Post-storage pH | A | A | A | A | B | A | C | A | B |

(*1) added until the pH of the ink was 9.5
(*2) added until the pH of the ink was 12
(*3) Acetylene glycol ethyleneoxide adduct (manufactured by Kawaken Fine Chemicals Co., Ltd.)

<Evaluation>

The above-obtained black inks 1 to 9 were respectively mounted onto a ink jet printer (modified machine of PIXUS 950i manufactured by Canon Inc.), which was an on-demand type ink jet recording apparatus that used a heater element as the energy source for ink ejection. The following evaluation topics were evaluated.

(1) Image Density

Ink was filled into the above-described printer. Printing of 100% duty were carried out on ink jet glossy recording media PR101 (manufactured by Canon Inc.), followed by drying for 24 hours. The images were then evaluated for image density. A spectrophotometer (Spectorolino; manufactured by Gretag Macbeth) was used for the measurement. The image density criteria were as follows. The evaluated results are shown in Table 4.

A: Image density of 2.1 or more
B: Image density of 1.9 or more and 2.1 or less
C: Image density less than 1.9

(2) Color

Ink was filled into the above-described printer. Printing of 100% duty were carried out on ink jet glossy recording media PR101 (manufactured by Canon Inc.), followed by C: After attaching the head, some nozzles were not able to carry out ejection even after 5 or more purgings (4) Storage Stability Ink was put into a Teflon jar, and stored for 10 days under a 60° C. environment. The absorbance spectrum of the ink for before and after storage was measured, whereby the residual ratio of the peak intensity at maximum absorbance was calculated. A spectrophotometer (Trade name: U-3300; manufactured by Hitachi Ltd.) was used for the measurement of peak intensity at maximum absorbance. Measurement was carried out in a range of 380 nm to 780 nm. The ink was measured after diluting 2,000-fold with pure water. The storage stability criteria were as follows. The evaluated results are shown in Table 4.

A: Residual ratio of the peak intensity at maximum absorbance was 99% or more
B: Residual ratio of the peak intensity at maximum absorbance was 95% or more and less than 99%
C: Residual ratio of the peak intensity at maximum absorbance was less than 95%

TABLE 4

| | Black Ink | Image density | Color | Sticking recovery property | Storage stability |
|---|---|---|---|---|---|
| Example | 1 | 1 | B | B | A | A |
| | 2 | 2 | A | B | B | A |
| | 3 | 3 | A | B | A | A |
| | 4 | 4 | A | B | A | B |
| | 5 | 5 | A | B | A | B |
| | 6 | 6 | A | A | A | A |
| Comparative Example | 1 | 7 | A | B | A | C |
| | 2 | 8 | A | B | C | A |
| | 3 | 9 | A | B | A | C |

As can be seen from Examples 2 and 3 and Comparative Example 2, a moisture-retaining nitrogen compound improves sticking recovery property. As can be seen from Examples 2 and 4 and Comparative Example 3, if the initial pH and post-storage pH of the ink are 9.5 or less, there is almost no occurrence of color change, and if the pH's are 9.0 or less there is no color change at all. As can be seen from Example 5 and Comparative Example 1, if a buffer is added into the ink, the rise in pH is suppressed even if a substance which raises pH as a result of storage such as urea is present. As a result, there is almost no occurrence of color change. As can be seen from Examples 1, 3 and 6, the coloring material concentration is preferably 3% or more as image density is higher. Further, combining Exemplified Compound 1 with Exemplified Compound 2 and C.I. Direct Orange 39 provides a preferable black ink having a smaller C*.

<Ink Set>

If an ink set is capped with the same cap, it is assumed that since the cap interior becomes full of the volatile components of the inks constituting the ink set, the volatile components of the other inks are mixed with the black ink according to the present invention. With this in mind, the following model experiment was conducted.

The purpose of the model experiment was to confirm whether the black ink would suffer from negative effects caused by the above-described mixing of volatile components in the black ink when a cap interior was actually filled with volatile components. The experiment was carried out based on the idea that the same phenomenon would occur even if an ink set was actually capped using the same cap.

The present inventors confirmed that when the capped standing time is a long time, for example one year, the same phenomenon as that of the model experiment occurred in a marked manner. To cause the above-described phenomenon to occur in a short period of time, a model experiment according to the above-described structure was carried out.

<Preparation of the Coloring Material of Cyan Ink (Coloring Material A)>

(1) Synthesis of tetrasodium copper phthalocyanine tetrasulfonate (Formula (C))

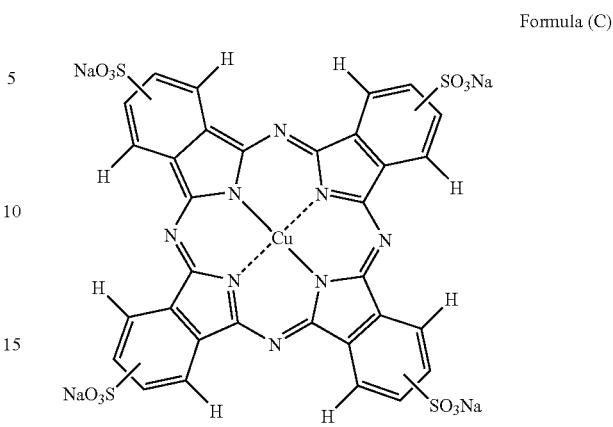

Formula (C)

Sulfolane, monosodium 4-sulfophthalate, ammonium chloride, urea, ammonium molybdate and copper (II) chloride were mixed, stirred, and washed with methanol. After that, water was added to the resultant product, and an aqueous solution of sodium hydroxide was used to adjust the pH of the solution to 11. An aqueous solution of hydrochloric was added to the resultant solution under stirring, and then sodium chloride was gradually added to separate out crystals. The resultant crystals were filtered out and washed with a 20% aqueous solution of sodium chloride, and then methanol was added. The separated out crystals were filtered out, washed with a 70% aqueous solution of methanol, and dried to thereby prepare tetrasodium copper phthalocyanine tetrasulfonate (formula (C)) as blue crystals.

(2) Synthesis of copper phthalocyanine tetrasulfonic chloride (Formula (D))

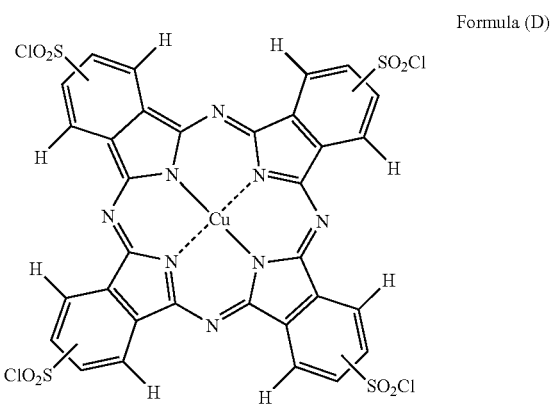

Formula (D)

Tetrasodium copper phthalocyanine tetrasulfonate (formula (C)) thus prepared was gradually added to chlorosulfonic acid, and then thionyl chloride was added dropwise to perform reaction. After that, the reaction solution was then cooled, and the separated out crystals were filtered to prepare a wet cake of copper phthalocyanine tetrasulfonic chloride of formula (D).

(3) Synthesis of the Following Compound X (Formula (E))

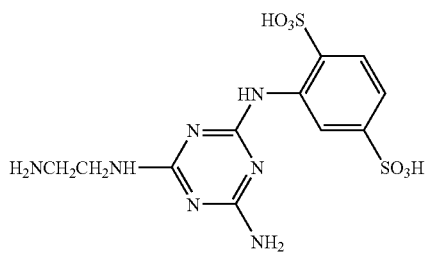

Formula (E)

Lipal OH, cyanuric chloride, and monosodium aniline-2, 5-disulfonate were added in an ice water, and were allowed to react while an aqueous solution of sodium hydroxide was added. Next, an aqueous solution of sodium hydroxide was added to the reaction solution to adjust the pH of the reaction solution to 10. 28% ammonium water and ethylenediamine were added to the reaction solution to perform reaction. Sodium chloride and concentrated hydrochloric acid were added to the resultant reaction solution to separate out crystals. The separated out crystals were filtered and fractionated, and was washed with a 20% aqueous solution of sodium chloride to prepare a wet cake. Methanol and water were added to the resultant wet cake, and the whole was filtered, washed with methanol, and dried to prepare compound X of the formula (E).

(4) Synthesis of Coloring Material A

The wet cake of copper phthalocyanine tetrasulfonic chloride (formula (D)) synthesized in the above (2) was added to an ice water, and the whole was stirred to prepare a suspension. Ammonia water and the compound X (formula (E)) synthesized in (3) were added to the suspension to perform reaction. Water and sodium chloride were added to the mixture to separate out crystals. The resultant crystals were filtered, washed with an aqueous solution of sodium chloride, and filtered again, washed, and dried to prepare a coloring material A as blue crystals.

A compound represented by the following formula (F), sodium carbonate, and ethyl benzoyl acetate were allowed to react to one another in xylene, and the reactant was filtered and washed. To the resultant, were sequentially added m-amino acetanilide, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide. Anthranilic acid was added to the reaction liquid to carry out a condensation reaction in the presence of sodium hydroxide. The resultant was filtered and washed to prepare a coloring material B.

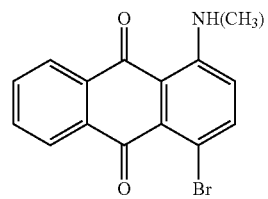

Formula (F)

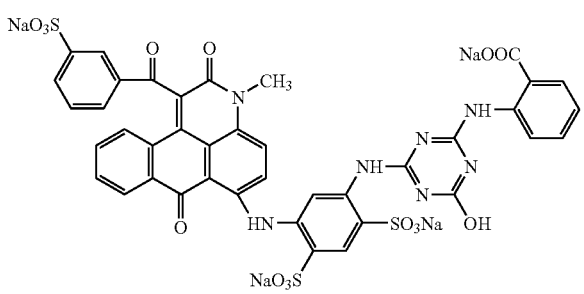

Coloring material B

<Preparation of Ink Set>

Coloring material A

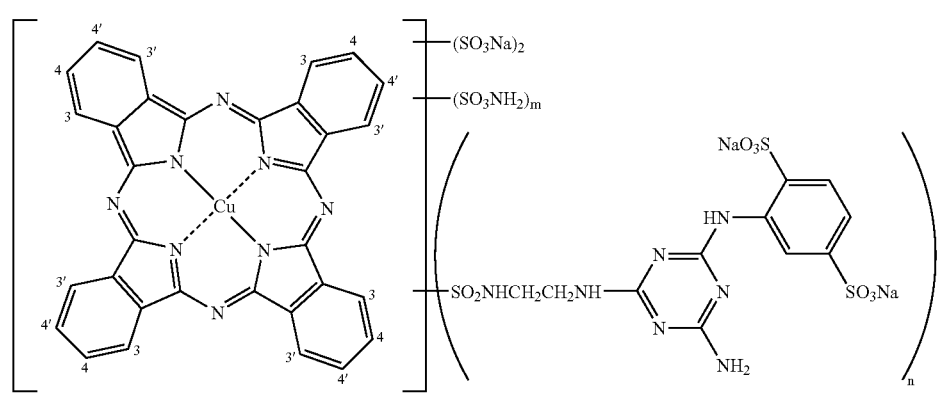

(In the coloring material A, l represents 0 to 2, m represents 1 to 3, and n represents 1 to 3 (provided that l+m+n=3 to 4); and positions at which the substituents are present are the 4- or 4'-positions.)

<Preparation of the Coloring Material of Magenta Ink (Coloring Material B)>

The respective components shown in the Table 5 below were mixed and sufficiently stirred. After that, the resultant product was filtered through a membrane filter having a pore size of 0.2 μm under pressure to prepare cyan inks 1 and 2, and magenta inks 1 and 2.

TABLE 5

| | Cyan Ink | | Magenta Ink | |
|---|---|---|---|---|
| | 1 | 2 | 1 | 2 |
| Coloring material A | 5.0 | 5.0 | | |
| Coloring material B | | | 5.0 | 5.0 |
| Ethyleneglycol | 7.5 | 7.5 | 7.5 | 7.5 |
| Ethyleneurea | 7.5 | 7.5 | 7.5 | 7.5 |
| 28 mass % ammonia water | | 80.0 | | 80.0 |
| Ion-exchange water | 80.0 | | 80.0 | |

In the present invention an ink set was made by combining black ink, cyan ink and magenta ink. Obviously, the present invention is not restricted to this.

The ink sets of Example 7 and Comparative Example 4 were made using the cyan ink and magenta ink of Table 5, and the above-described black ink 4 in the combination shown in the below Table 6.

TABLE 6

| Example 7 | Comparative Example 4 |
|---|---|
| Black Ink 4 | Black Ink 4 |
| Cyan Ink 1 | Cyan Ink 2 |
| Magenta Ink 1 | Magenta Ink 2 |

<Evaluation>

The inks constituting the ink set according to Example 7 were charged into respective 50 ml beakers. These beakers were put in a vessel made from polypropylene, which was then sealed. This polypropylene vessel was left for one month in a 24° C. temperature environment. After the one month, the black ink constituting the ink set according to Example 7 was filled into an ink jet printer (modified machine of PIXUS 950i manufactured by Canon Inc.), and 100% duty printing was carried out recording media, which was ink jet glossy recording media PR101 (manufactured by Canon Inc.). The same steps were conducted for the ink set according to Comparative Example 4.

From confirmation of the obtained recorded product, it was learned that in Example 7 the print of the recorded product reproduced using the ink prior to being left to stand showed almost no difference by visual observation with the print of the recorded product reproduced using the ink after being left to stand. In contrast, in Comparative Example 4, visual observation confirmed color change occurring between the prints of the recorded product reproduced using the ink prior to being left to stand and the print of the recorded product reproduced using the ink after being left to stand.

This application claims priority from each of Japanese Patent Application No. 2004-196445 filed on Jul. 2, 2004, and Japanese Patent Application No. 2005-192200 filed on Jun. 30, 2005, which are hereby incorporated by reference herein.

What is claimed is:

1. An ink jet black ink comprising at least a compound represented by the following general formula (I) or a salt thereof, characterized in that
    the ink jet black ink further comprises at least one moisture-retaining nitrogen compound, and
    the pH of the ink and the pH of the ink after storing for 10 days in an environment at a temperature of 60° C. are 9.0 or less:

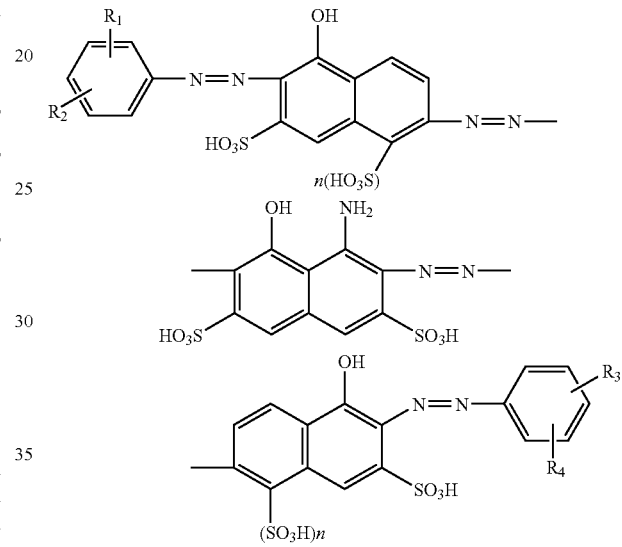

General Formula (I)

wherein $R_1$, $R_2$, $R_3$ and $R_4$ represent each independently a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group or a carboxyl group; an alkoxy group having 1 to 4 carbon atoms which may be further substituted with a carboxyl group or a sulfonic group; or an amino group substituted with a phenyl group, an alkyl group or an acyl group, and n represents 0 or 1.

2. The ink jet black ink according to claim 1, further comprising a compound represented by the following general formula (II) or a salt thereof:

General Formula (II)

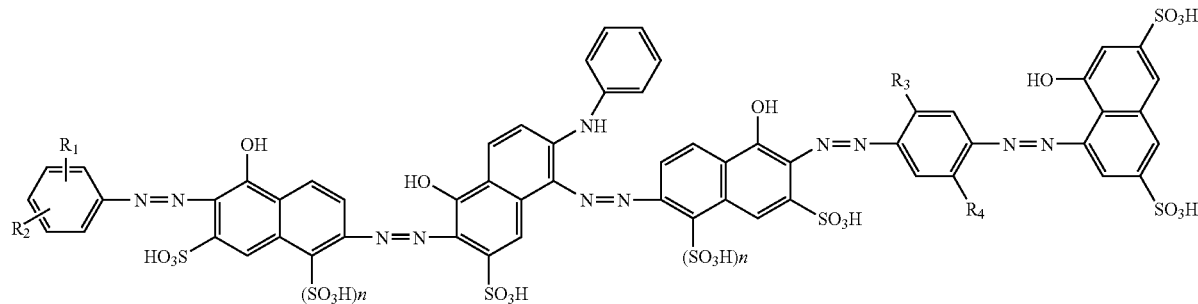

wherein R₁ and R₂ represent each independently a hydrogen atom; a hydroxyl group; an amino group; a carboxyl group; a sulfonic group; an alkyl group having 1 to 4 carbon atoms; or an alkoxy group having 1 to 4 carbon atoms; and R₃ and R₄ represent a hydrogen atom; an alkyl group having 1 to 4 carbon atoms; an alkoxy group having 1 to 4 carbon atoms; a hydroxyl group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfonic group or a carboxyl group; or an amino group substituted with an alkyl group or an acyl group, and n represents 0 or 1.

3. The ink jet black ink according to claim 1, further comprising at least one compound selected from the group consisting of a condensed dye or a salt thereof of a compound represented by the following general formula (III) and a compound represented by the following general formula (IV) and a dye obtained by the reduction of the condensed dye or the salt thereof, wherein the counter ion of the dye after the condensation or reduction is a hydrogen ion, alkali metal ion, organic amine cation or ammonium ion:

General Formula (III)

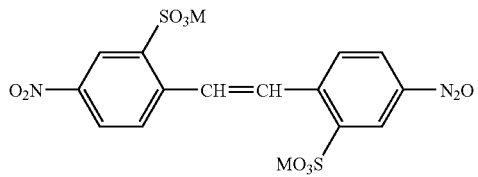

wherein M represents a hydrogen atom or an alkali metal atom,

General Formula (IV)

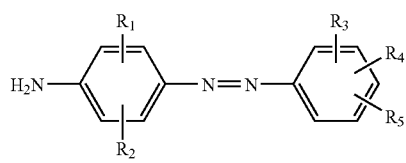

wherein R₁, R₂, R₃, R₄ and R₅ represent each independently a hydrogen atom; a halogen atom; a hydroxyl group; a sulfonic group; a carboxyl group; an alkyl group having 1 to 4 carbon atoms; or an alkoxy group having 1 to 4 carbon atoms.

4. The ink jet black ink according to claim 1, wherein the moisture-retaining nitrogen compound is ethyleneurea or 2-pyrrolidone.

5. The ink jet black ink according to claim 1, further comprising a pH buffer.

6. An ink set, comprising a plurality of inks, which comprises the ink jet black ink according to claim 1 as a black ink.

7. The ink set according to claim 6, wherein other inks capped using the same cap for capping the black ink do not comprise a volatile base.

8. The ink set according to claim 7, wherein the volatile base is ammomia.

9. An ink jet recording method, comprising ejecting an ink by an ink jet method, wherein the ink comprises the ink jet black ink according to claim 1.

10. An ink cartridge, comprising an ink storage portion for storing ink, wherein the ink comprises the ink jet black ink according to claim 1.

11. A recording unit, comprising an ink storage portion for storing ink and a recording head for ejecting the ink, wherein the ink comprises the ink jet black ink according to claim 1.

12. An ink jet recording apparatus, comprising an ink storage portion for storing ink and a recording head for ejecting the ink, wherein the ink comprises the ink jet black ink according to claim 1.

* * * * *

UNITED STATES PATENT AND TRADEMARK OFFICE
CERTIFICATE OF CORRECTION

| | |
|---|---|
| PATENT NO. | : 7,198,665 B2 |
| APPLICATION NO. | : 11/321530 |
| DATED | : April 3, 2007 |
| INVENTOR(S) | : Kunihiko Nakamura et al. |

It is certified that error appears in the above-identified patent and that said Letters Patent is hereby corrected as shown below:

ON THE TITLE PAGE

Item (75), Inventors,

"Kunihiko Nakamura, Shizuoka" should read --Kunihiko Nakamura, Gotenba--.

"Shin-ichi Sato, Kanagawa" should read --Shin-ichi Sato, Kawasaki--.

"Kumiko Mafune, Kanagawa" should read --Kumiko Mafune, Kawasaki--.

"Hideki Takayama, Kanagawa" should read --Hideki Takayama, Fujisawa--.

"Daiji Okamura, Kanagawa" should read --Daiji Okamura, Yokohama--.

COLUMN 3

Line 3, "Another" should read --Other--.

COLUMN 11

Line 59, "2-pyrrolione" should read --2-pyrrolidone--.

COLUMN 19

Line 32, "elect" should read --eject--.

COLUMNS 21-22

Lines 3-13, the chemical drawing shown beneath "Exemplified Compound 1" should be deleted and replaced with the following chemical drawing:

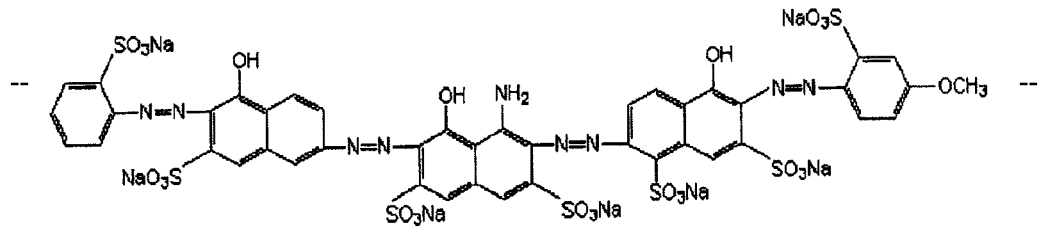

UNITED STATES PATENT AND TRADEMARK OFFICE
CERTIFICATE OF CORRECTION

PATENT NO. : 7,198,665 B2
APPLICATION NO. : 11/321530
DATED : April 3, 2007
INVENTOR(S) : Kunihiko Nakamura et al.

It is certified that error appears in the above-identified patent and that said Letters Patent is hereby corrected as shown below:

COLUMN 23

Line 46, "a" should read --an--.

COLUMN 25

Line 25, "pH's" should read --pH values--.

COLUMN 26

Line 27, "ric" should read --ric acid--.

COLUMNS 27-28

Lines 42-57, the chemical drawing shown beneath "Coloring material A" should be deleted and replaced with the following chemical drawing:

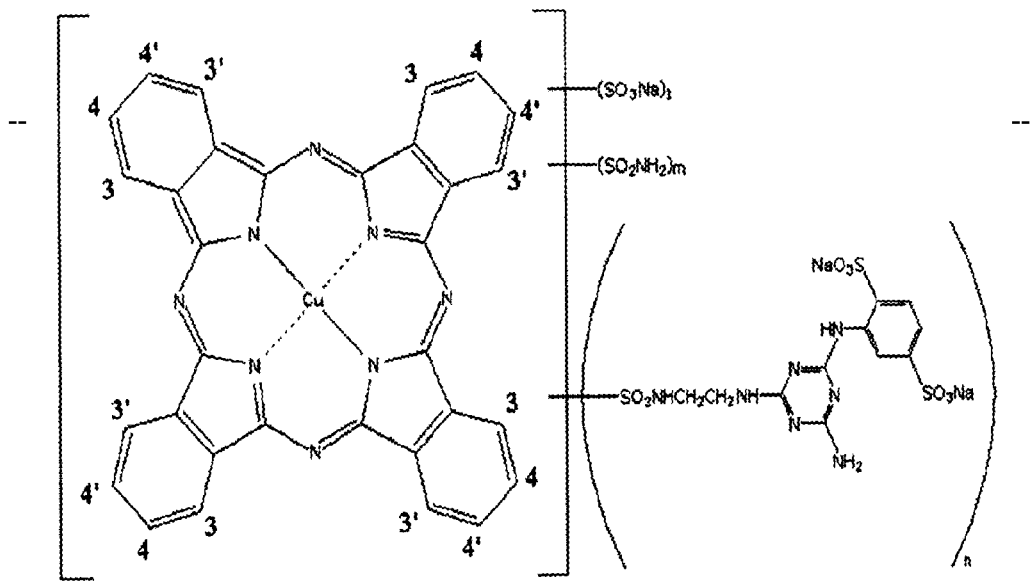

UNITED STATES PATENT AND TRADEMARK OFFICE
CERTIFICATE OF CORRECTION

| | |
|---|---|
| PATENT NO. | : 7,198,665 B2 |
| APPLICATION NO. | : 11/321530 |
| DATED | : April 3, 2007 |
| INVENTOR(S) | : Kunihiko Nakamura et al. |

It is certified that error appears in the above-identified patent and that said Letters Patent is hereby corrected as shown below:

<u>COLUMN 29</u>

Line 38, "out" should read --out on--.

<u>COLUMN 32</u>

Line 35, "ammomia" should read --ammonia--.

Signed and Sealed this

Twenty-seventh Day of May, 2008

JON W. DUDAS
*Director of the United States Patent and Trademark Office*